(12) United States Patent
Kubo et al.

(10) Patent No.: US 12,338,341 B2
(45) Date of Patent: *Jun. 24, 2025

(54) INFRARED-CUT FILTER

(71) Applicant: Nippon Sheet Glass Company, Limited, Tokyo (JP)

(72) Inventors: Yuichiro Kubo, Tokyo (JP); Katsuhide Shimmo, Kanagawa (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 58 days.

This patent is subject to a terminal disclaimer.

(21) Appl. No.: 18/528,216

(22) Filed: Dec. 4, 2023

(65) Prior Publication Data
US 2024/0117151 A1    Apr. 11, 2024

Related U.S. Application Data

(63) Continuation of application No. 16/921,627, filed on Jul. 6, 2020, now Pat. No. 11,873,385, which is a
(Continued)

(30) Foreign Application Priority Data

Sep. 24, 2015    (JP) ................. 2015-187295

(51) Int. Cl.
C08K 5/521    (2006.01)
C08K 5/5317    (2006.01)
(Continued)

(52) U.S. Cl.
CPC ............ *C08K 5/5317* (2013.01); *C08K 5/521* (2013.01); *G02B 5/208* (2013.01); *G02B 5/22* (2013.01);
(Continued)

(58) Field of Classification Search
CPC .......... C08K 3/32; C08K 5/521; C08K 5/531; C08K 2201/003; G02B 5/22; G02B 5/208; G02B 5/223; G03B 11/00
See application file for complete search history.

(56) References Cited

U.S. PATENT DOCUMENTS

| 7,025,908 B1 | 4/2006 | Hayashi et al. |
| 10,745,541 B2 | 8/2020 | Kubo et al. |
| | (Continued) | |

FOREIGN PATENT DOCUMENTS

| JP | 2000193819 | 7/2000 |
| JP | 2001042230 | 2/2001 |
| | (Continued) | |

OTHER PUBLICATIONS

International Search Report issued for International Patent Application No. PCT/JP2016/004163, dated Dec. 13, 2016, 5 pages including English translation.

*Primary Examiner* — Bijan Ahvazi
(74) *Attorney, Agent, or Firm* — HSML P.C.

(57) ABSTRACT

A composition for infrared-absorbing layers according to the present invention includes: a compound formed by copper ion and a phosphonic acid represented by the following formula (a); and at least one of a phosphoric acid diester represented by the following formula (b1) and a phosphoric acid monoester represented by the following formula (b2). In the composition, fine particles containing at least the compound are dispersed. A content of the phosphonic acid is less than 2.5 times a total content of the phosphoric acid diester and the phosphoric acid monoester on a molar basis. $R_1$ is an alkyl group with 2 to 4 carbon atoms, $R_{21}$, $R_{22}$, and $R_3$ are each a monovalent functional group represented by $—(CH_2CH_2O)_n R_4$ wherein n is an integer of 1 to 25 and $R_4$ is an alkyl group with 6 to 25 carbon atoms.

(Continued)

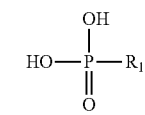

(a)

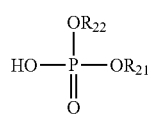

(b1)

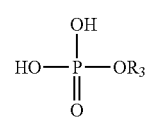

(b2)

11 Claims, 11 Drawing Sheets

Related U.S. Application Data continuation of application No. 15/762,182, filed as application No. PCT/JP2016/004163 on Sep. 13, 2016, now Pat. No. 10,745,541.

(51) Int. Cl.
*G02B 5/20* (2006.01)
*G02B 5/22* (2006.01)
*G03B 11/00* (2021.01)
*C08K 3/32* (2006.01)

(52) U.S. Cl.
CPC .............. *G02B 5/223* (2013.01); *G03B 11/00* (2013.01); *C08K 3/32* (2013.01); *C08K 2003/329* (2013.01); *C08K 2201/003* (2013.01); *C08K 2201/005* (2013.01); *C08K 2201/011* (2013.01)

(56) References Cited

U.S. PATENT DOCUMENTS

| | | |
|---|---|---|
| 10,809,427 B2 | 10/2020 | Kubo et al. |
| 2001/0005278 A1 | 6/2001 | Onomichi et al. |
| 2005/0008969 A1 | 1/2005 | Miyako et al. |
| 2012/0251803 A1 | 10/2012 | Shibuya et al. |
| 2013/0094075 A1 | 4/2013 | Saitoh et al. |

FOREIGN PATENT DOCUMENTS

| | | | | |
|---|---|---|---|---|
| JP | 2001154015 | | 6/2001 | |
| JP | 2001174627 | | 6/2001 | |
| JP | 2001264532 | | 9/2001 | |
| JP | 2002-069305 | * | 3/2002 | ............ C08L 101/00 |
| JP | 2002156521 | | 5/2002 | |
| JP | 2008165215 | | 7/2008 | |
| JP | 2009242650 | | 10/2009 | |
| JP | 2011099038 | | 5/2011 | |
| JP | 2011203467 | | 10/2011 | |
| JP | 2011203467 A | * | 10/2011 | ............... G02B 5/22 |
| JP | 2013253224 | | 12/2013 | |
| JP | 2015131928 | | 7/2015 | |
| WO | 2011158635 | | 12/2011 | |
| WO | 2013168824 | | 11/2013 | |
| WO | 2015107939 | | 7/2015 | |

\* cited by examiner

INFRARED-CUT FILTER

TECHNICAL FIELD

The present invention relates to a composition for infrared-absorbing layers, an infrared-cut filter, and an imaging apparatus.

BACKGROUND ART

In imaging apparatuses such as digital cameras, silicon (Si)-based two-dimensional image sensors such as a charge coupled device (CCD) and a complementary metal oxide semiconductor (CMOS) are used as imaging sensors. Such a Si-based imaging sensor is sensitive to light of wavelengths in the infrared region and has wavelength characteristics incompatible with the visual sensitivity of humans. In imaging apparatuses, therefore, a filter (infrared-cut filter) for shielding against incident light of wavelengths in the infrared region is typically disposed ahead of an imaging sensor so that an image obtained by the imaging sensor comes closer to an image as perceived by humans.

For example, Patent Literature 1 describes a composite filter including an absorptive cut filter (light-absorbing element) and a reflective cut coating (interference film) provided on a surface of the absorptive cut filter.

Patent Literature 2 describes an infrared-cut filter made up of an infrared absorber and infrared reflector which are bonded together. The infrared absorber is produced by forming an anti-reflection film (AR coating) on a principal surface of an infrared-absorbing glass. The infrared-absorbing glass is a blue glass in which a coloring matter such as copper ion is dispersed. The anti-reflection film is formed by using a vacuum deposition apparatus to vacuum-deposit a single layer film made of $MgF_2$, multilayer film made of $Al_2O_3$, $ZrO_2$, and $MgF_2$, or multilayer film made of $TiO_2$ and $SiO_2$ on the principal surface of the infrared-absorbing glass. The infrared reflector is produced by forming an infrared-reflecting film on a principal surface of a transparent substrate. The infrared-reflecting film is a multilayer film composed of first thin films made of a high refractive index material such as $TiO_2$ and second thin films made of a low refractive index material such as $SiO_2$, the first and second thin films being alternately laminated.

Patent Literature 3 describes an optical film having a near-infrared-absorbing layer including a transparent resin containing a given organic dye.

Patent Literature 4 describes an optical filter including a near-infrared-absorbing layer containing at least one component selected from: a component composed of a given phosphoric acid ester compound and copper ion; and phosphoric acid ester-copper compound obtained by a reaction between a given phosphoric acid ester compound and copper compound. The near-infrared-absorbing layer may be formed from a resin composition including a resin such as an acrylic resin that contains the above component(s).

CITATION LIST

Patent Literature

Patent Literature 1: JP 2001-42230 A
Patent Literature 2: WO 2011/158635 A1
Patent Literature 3: JP 2008-165215 A
Patent Literature 4: JP 2001-154015 A

SUMMARY OF INVENTION

Technical Problem

The techniques described in Patent Literatures 1 and 2 involve forming an interference film such as a reflective cut coating or anti-reflection film to obtain desired infrared absorption properties. The technique of Patent Literature 3 may require incorporating a plurality of organic dyes into the transparent resin to achieve desired infrared absorption properties, since the given organic dye can absorb only infrared light of a limited range of wavelengths. However, dispersing a plurality of organic dyes in a transparent resin is often difficult, and this may necessitate using a reflective filter to complement the absorption performance for a range of wavelengths in the infrared region.

The technique described in Patent Literature 4 is advantageous in the following respects. First, a compound composed of a phosphoric acid-based compound such as a phosphoric acid ester and copper ion can have absorption properties appropriate for light in the infrared region, and an optical product with optical properties more compatible with the visual sensitivity of humans can be produced by dispersing such a compound in a matrix component. An optical filter (infrared-cut filter) containing the compound composed of a phosphoric acid-based compound and copper ion as an infrared-absorbing component is unlikely to cause problems in terms of heat resistance and weather resistance and is superior in terms of flexibility in the design of optical properties, workability, adaptability to many kinds of products, and manufacturing cost.

It goes without saying that infrared-cut filters are required to have high light transmittance in the visible region. As for the optical filter described in Patent Literature 4, the light transmittance at wavelengths around 400 nm (400 nm to 450 nm) is somewhat lower than the peak value of the light transmittance in the visible region. Thus, when the optical filter described in Patent Literature 4 is used, it may be difficult to transmit a large amount of light uniformly over the entire visible region.

In view of such circumstances, the present invention provides a composition for infrared-absorbing layers that is capable of imparting desired optical properties to an infrared-cut filter for use in an imaging apparatus and that is capable of reducing the extent to which the light transmittance of the infrared-cut filter at around 400 nm is relatively low among light transmittances in the visible region.

Solution to Problem

The present invention provides a composition for infrared-absorbing layers, the composition including:
a compound formed at least by copper ion and a phosphonic acid represented by the following formula (a); and
at least one of a phosphoric acid diester represented by the following formula (b1) and a phosphoric acid monoester represented by the following formula (b2):

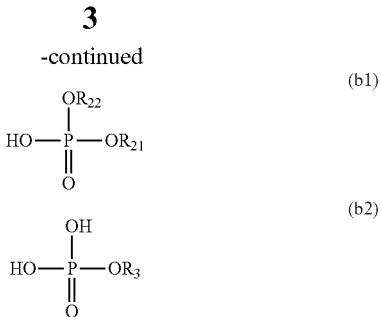

wherein
fine particles containing at least the compound are dispersed,
a content of the phosphonic acid is less than 2.5 times a total content of the phosphoric acid diester and the phosphoric acid monoester on a molar basis, and
in the formulae, $R_1$ is an alkyl group with 2 to 4 carbon atoms, $R_{21}$, $R_{22}$, and $R_3$ are each a monovalent functional group represented by $-(CH_2CH_2O)_nR_4$ wherein n is an integer of 1 to 25 and $R_4$ is an alkyl group with 6 to 25 carbon atoms, and $R_{21}$, $R_{22}$, and $R_3$ are the same or different functional groups.

The present invention also provides an infrared-cut filter including:
a transparent dielectric substrate; and
an infrared-absorbing layer provided on at least one principal surface of the transparent dielectric substrate, the infrared-absorbing layer being formed using the above composition for infrared-absorbing layers.

The present invention further provides an imaging apparatus including:
the above infrared-cut filter; and
an imaging sensor on which light transmitted through the infrared-cut filter is incident.

Advantageous Effects of Invention

With the above composition for infrared-absorbing layers, an infrared-cut filter having desired optical properties as an infrared-cut filter for use in an imaging apparatus can be produced. Additionally, using the composition for infrared-absorbing layers to form an infrared-cut filter reduces the extent to which the light transmittance of the infrared-cut filter at around 400 nm is relatively low among light transmittances in the visible region.

DESCRIPTION OF EMBODIMENTS

Figure 1:
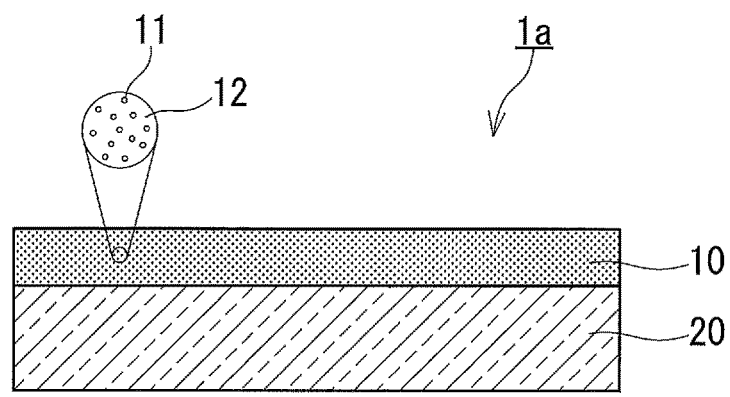
FIG. 1 is a cross-sectional view of an infrared-cut filter according to an embodiment of the present invention.

Hereinafter, embodiments of the present invention will be described with reference to the drawings. The following description relates to examples of the present invention, and the present invention is not limited to the examples.

A composition for infrared-absorbing layers according to the present invention includes: a compound formed at least by copper ion and a phosphonic acid represented by the formula (a) below; and at least one of a phosphoric acid diester represented by the formula (b1) below and a phosphoric acid monoester represented by the formula (b2) below. In the composition for infrared-absorbing layers according to the present invention, fine particles containing the compound formed at least by copper ion and the phosphonic acid represented by the formula (a) are dispersed. The content of the phosphonic acid is less than 2.5 times the total content of the phosphoric acid diester represented by the formula (b1) and the phosphoric acid monoester represented by the formula (b2) on a molar basis.

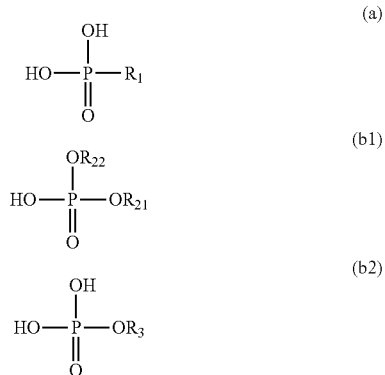

In the above chemical formulae, $R_1$ is an alkyl group with 2 to 4 carbon atoms. $R_{21}$, $R_{22}$, and $R_3$ are each a monovalent functional group represented by $-(CH_2CH_2O)_nR_4$ wherein n is an integer of 1 to 25 and $R_4$ is an alkyl group with 6 to 25 carbon atoms. $R_{21}$, $R_{22}$, and $R_3$ are the same or different functional groups.

The fine particles are formed, for example, by coordination of the phosphonic acid represented by the formula (a) to copper ion. Through a great deal of trial and error, the inventors have discovered that an infrared-cut filter including an infrared-absorbing layer formed using the composition for infrared-absorbing layers has desired optical properties when the content of the phosphonic acid represented by the formula (a) is less than 2.5 times the total content of the phosphoric acid diester represented by the formula (b1) and the phosphoric acid monoester represented by the formula (b2) on a molar basis. The inventors have completed the present invention based on this discovery. That is, an infrared-cut filter including an infrared-absorbing layer formed using the composition for infrared-absorbing layers according to the present invention has desired infrared absorption properties and desired visible light transmission properties. In particular, the light transmittance of the infrared-cut filter at wavelengths around 400 nm is high, leading to a reduction in the extent to which the light transmittance of the infrared-cut filter at wavelengths around 400 nm is relatively low among light transmittances in the visible region. For example, the content of the phosphonic acid represented by the formula (a) is 0.85 or more times the total content of the-phosphoric acid diester represented by the formula (b1) and the phosphoric acid monoester represented by the formula (b2) on a molar basis. This ensures a reduction in the extent to which the light transmittance of the infrared-cut filter at wavelengths around 400 nm is relatively low among light transmittances in the visible region.

The content of the phosphonic acid represented by the formula (a) in the composition for infrared-absorbing layers is, for example, 0.45 times to 0.9 times the copper ion content on a molar basis. The source material of copper ion is, for example, a copper salt. Examples of the copper salt include copper acetate, a hydrate of copper acetate, copper benzoate, and copper hydroxide. For example, copper acetate monohydrate is represented by $Cu(CH_3COO)_2 \cdot H_2O$, and 1 mol of copper acetate monohydrate supplies 1 mol of copper ion.

The average particle diameter of the fine particles is, for example, 5 nm to 200 nm. When the average particle diameter of the fine particles is 5 nm or more, any particular ultramicronization process for obtaining the fine particles is not required, and there is a small risk that the structure of the fine particles formed by copper ion and the phosphonic acid will be broken. Additionally, the fine particles are successfully dispersed in the composition for infrared-absorbing layers. When the average particle diameter of the fine particles is 200 nm or less, it is possible to reduce the influence of Mie scattering, increase the visible transmittance of an infrared-cut filter, and prevent deterioration of the properties such as contrast and haze of an image captured by an imaging apparatus. The average particle diameter of the fine particles is desirably 100 nm or less. In this case, the influence of Rayleigh scattering is reduced, and thus the resulting infrared-absorbing layer has an increased transparency to visible light. The average particle diameter of the fine particles is more desirably 75 nm or less. In this case, the transparency of the infrared-absorbing layer to visible light is especially high. The average particle diameter of the fine particles can be measured by a dynamic light scattering method.

The fine particles may be formed at least by copper ion, the phosphonic acid represented by the formula (a), and at least one of the phosphoric acid diester represented by the formula (b1) and the phosphoric acid monoester represented by the formula (b2). In the fine particles, for example, not only the phosphonic acid represented by the formula (a) but also at least one of the phosphoric acid diester represented by the formula (b1) and the phosphoric acid monoester represented by the formula (b2) may coordinate to copper ion.

The composition for infrared-absorbing layers may further include phosphoric acid. In this case, it is possible to advantageously reduce the extent to which the light transmittance of the infrared-cut filter at wavelengths around 400 nm is relatively low among light transmittances in the visible region. The present inventors believe that this is due to the dispersibility of the fine particles being improved by the incorporation of phosphoric acid. The phosphoric acid content in the composition for infrared-absorbing layers is, for example, 0.04 times to 0.21 times the copper ion content in the composition for infrared-absorbing layers on a molar basis.

When the composition for infrared-absorbing layers further includes phosphoric acid, the fine particles may be formed at least by copper ion, the phosphonic acid represented by the formula (a), at least one of the phosphoric acid diester represented by the formula (b1) and the phosphoric acid monoester represented by the formula (b2), and phosphoric acid. In the fine particles, for example, phosphoric acid may coordinate to copper ion.

$R_1$ of the phosphonic acid represented by the formula (a) is, for example, an ethyl group or a butyl group (n-butyl group). In this case, the infrared-cut filter has good infrared absorption properties and good visible light transmission properties and, in addition, it is possible to advantageously reduce the extent to which the light transmittance of the infrared-cut filter at wavelengths around 400 nm is relatively low among light transmittances in the visible region. $R_1$ of the phosphonic acid represented by the formula (a) may be, for example, a propyl group (n-propyl group).

Two hydroxy groups contained in one molecule of the phosphonic acid represented by the formula (a), one hydroxy group contained in one molecule of the phosphoric acid diester represented by the formula (b1), one hydroxy group contained in one molecule of the phosphoric acid monoester represented by the formula (b2), and two hydroxy groups contained in one molecule of phosphoric acid optionally contained in the composition for infrared-absorbing layers are defined as reactive hydroxy groups. In this case, the content of the reactive hydroxy groups in the composition for infrared-absorbing layers is, for example, 2.08 times to 2.5 times the copper ion content on a molar basis.

When the composition for infrared-absorbing layers further includes phosphoric acid, $R_1$ of the phosphonic acid represented by the formula (a) may be a butyl group. In this case, the content of the reactive hydroxy groups in the composition for infrared-absorbing layers is, for example, 1.95 or more times, desirably 2.0 or more times, the copper ion content on a molar basis. This ensures that the infrared-cut filter will have good infrared absorption properties and good visible light transmission properties, and makes it possible to more advantageously reduce the extent to which the light transmittance of the infrared-cut filter at wavelengths around 400 nm is relatively low among light transmittances in the visible region. The content of the reactive hydroxy groups in the composition for infrared-absorbing layers is, for example, 2.5 or less times, desirably 2.35 or less times, the copper ion content on a molar basis.

The definition of the reactive hydroxy groups is based on the following consideration by the present inventors. Both of the two hydroxy groups contained in one molecule of the phosphonic acid represented by the formula (a) are considered reactive with copper ion. The one hydroxy group contained in one molecule of the phosphoric acid diester represented by the formula (b1) is considered to participate in the reaction with copper ion. For the two hydroxy groups contained in one molecule of the phosphoric acid monoester represented by the formula (b2), it is considered that only one of the two hydroxy groups can participate in the reaction with copper ion due to steric hindrance caused by the fact that $R_3$ contains a polyoxyethylene group and a long-chain alkyl group. In one molecule of phosphoric acid, three hydroxy groups are bonded to a phosphorus atom. In view of the steric structure of phosphoric acid, at most two of the three hydroxy groups are considered to participate in the reaction with copper ion.

When the composition for infrared-absorbing layers is free of phosphoric acid, $R_1$ of the phosphonic acid represented by the formula (a) may be a butyl group. In this case, the content of the reactive hydroxy groups in the composition for infrared-absorbing layers is, for example, 2.08 or more times, desirably 2.1 or more times, the copper ion content on a molar basis. This ensures that the infrared-cut filter will have good infrared absorption properties and good visible light transmission properties, and makes it possible to more advantageously reduce the extent to which the light transmittance of the infrared-cut filter at wavelengths around 400 nm is relatively low among light transmittances in the visible region. The content of the reactive hydroxy groups in the composition for infrared-absorbing layers is, for example, 2.5 or less times, desirably 2.35 or less times, more desirably 2.3 or less times, the copper ion content on a molar basis.

$R_1$ of the phosphonic acid represented by the formula (a) may be an ethyl group. In this case, the content of the reactive hydroxy groups is, for example, 2.0 or more times, desirably 2.08 or more times, more desirably 2.1 or more times, the copper ion content on a molar basis. This ensures that the infrared-cut filter will have good infrared absorption properties and good visible light transmission properties, and makes it possible to more advantageously reduce the extent to which the light transmittance of the infrared-cut filter at wavelengths around 400 nm is relatively low among light transmittances in the visible region. The content of the reactive hydroxy groups in the composition for infrared-absorbing layers is, for example, 2.5 or less times, desirably 2.35 or less times, more desirably 2.3 or less times, the copper ion content on a molar basis.

The composition for infrared-absorbing layers according to the present invention further includes, for example, a matrix component. The matrix component is, for example, a resin that is transparent to visible light and infrared light and in which the above fine particles are dispersible. In this case, the content of the phosphonic acid represented by the formula (a) is, for example, 10 to 50 parts by mass with respect to 100 parts by mass of the matrix component in the composition for infrared-absorbing layers.

The matrix component is desirably a polysiloxane (silicone resin). Specific examples of polysiloxanes that can be used as the matrix component include KR-255, KR-300, KR-2621-1, KR-211, KR-311, KR-216, KR-212, and KR-251. All of these are silicone resins manufactured by Shin-Etsu Chemical Co., Ltd.

An exemplary method for preparing the composition for infrared-absorbing layers according to the present invention will be described. First, a copper salt such as copper acetate monohydrate is added to a given solvent such as tetrahydrofuran (THF), which is stirred to obtain a copper salt solution. Next, a phosphoric acid ester including at least one of the phosphoric acid diester represented by the formula (b1) and the phosphoric acid monoester represented by the formula (b2) is added to the copper salt solution, which is stirred to prepare a liquid A. The phosphonic acid represented by the formula (a) is added to a given solvent such as THF, which is stirred to prepare a phosphonic acid solution. If necessary, phosphoric acid is added to a given solvent such as THF, which is stirred to prepare a phosphoric acid solution. Next, the phosphonic acid solution is added to the liquid A while the liquid A is stirred, and the mixture is stirred for a given period of time. At this time, the phosphoric acid solution may be added to the liquid A if necessary. To the resulting solution is then added a given solvent such as toluene, and the solution is heat-treated at a given temperature to evaporate a portion of the solvents. Next, a matrix component such as silicone resin is added to the solution, which is stirred. The composition for infrared-absorbing layers can thus be prepared in a liquid form.

An infrared-cut filter 1a according to the present invention includes a transparent dielectric substrate 20 and an infrared-absorbing layer 10, as shown in FIG. 1. The infrared-absorbing layer 10 is formed on at least one principal surface of the transparent dielectric substrate 20 using the composition for infrared-absorbing layers according to the present invention. In the infrared-absorbing layer 10, fine particles 11 are dispersed in a matrix 12. The transparent dielectric substrate 20 is, for example, a transparent glass substrate.

The thickness of the infrared-absorbing layer 10 is, for example, 40 μm to 200 μm. This ensures that the infrared-cut filter 1a will exhibit desired optical properties.

An infrared-cut filter to be disposed ahead of an imaging sensor in an imaging apparatus such as a digital camera is required to have, for example, the following features (1) to (3).

(1) The light transmittance at wavelengths in the visible region (wavelengths of 400 nm to 600 nm) is high (for example, the spectral transmittance is 70% or more).
(2) The light transmittance at wavelengths in the infrared region (wavelengths of 800 nm to 1100 nm) is low (for example, the spectral transmittance is 5% or less).
(3) In a wavelength range where transition from the visible region to the infrared region occurs, the spectral transmittance sharply changes (decreases) from the visible region toward the infrared region.

The infrared-cut filter 1a possesses the above features (1) to (3) and therefore has desired optical properties as an infrared-cut filter to be disposed ahead of an imaging sensor in an imaging apparatus such as a digital camera. Additionally, in the infrared-cut filter 1a, the extent to which the light transmittance at wavelengths around 400 nm is relatively low among light transmittances in the visible region is reduced.

An exemplary method for producing the infrared-cut filter 1a will be described. First, the composition for infrared-absorbing layers which is in a liquid form is applied to one principal surface of the transparent dielectric substrate 20 by spin coating or with a dispenser to form a film. This film is then subjected to a given heat treatment and thus hardened. The infrared-cut filter 1a can be produced in this manner. The maximum of the ambient temperature during the heat treatment of the film is, for example, 140° C. or higher and desirably 160° C. or higher. This is likely to increase the light transmittance of the infrared-cut filter 1a at wavelengths around 400 nm.

Figure 2:
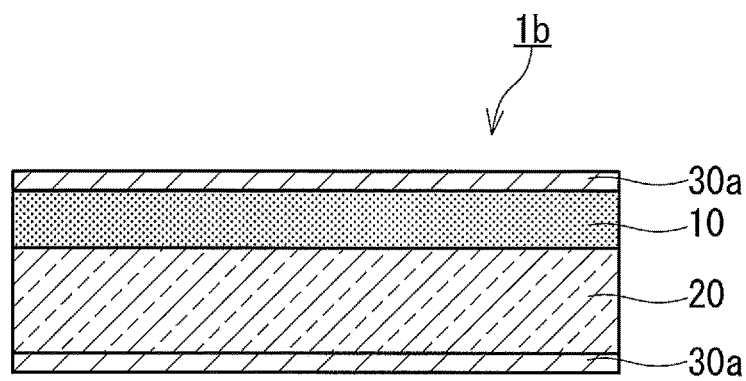
FIG. 2 is a cross-sectional view of an infrared-cut filter according to another embodiment of the present invention.

In another embodiment, the infrared-cut filter 1a may be modified to give an infrared-cut filter 1b as shown in FIG. 2. The infrared-cut filter 1b has the same configuration as the infrared-cut filter 1a, except for including anti-reflection films 30a on both principal surfaces of the infrared-cut filter 1b. Thus, Fresnel reflection light causing stray light can be eliminated, and the amount of transmitted light in the visible region can be increased. Various parameters such as the refractive index and thickness of the anti-reflection film 30a can be optimized by a known technique based on the refractive index of the transparent dielectric substrate 20 or infrared-absorbing layer 10. The anti-reflection film 30a is a single-layer film or a multilayer film. When the anti-reflection film 30a is a single-layer film, the anti-reflection film 30a is desirably made of a material having a refractive index lower than the refractive index of the transparent dielectric substrate 20 or infrared-absorbing layer 10. The anti-reflection film 30a may be made of a material having a refractive index equal to or higher than the refractive index of the transparent dielectric substrate 20 or infrared-absorbing layer 10. When the anti-reflection film 30a is a multilayer film, the anti-reflection film 30a is formed by alternately laminating two or more materials having different refractive indices. Examples of materials for forming the anti-reflection film 30a include inorganic materials such as $SiO_2$, $TiO_2$, and $MgF_2$ and organic materials such as fluorine resins. The method for forming the anti-reflection film 30a is not particularly limited, and any of the following methods can be used depending on the type(s) of the material(s) for forming the anti-reflection film 30a: vacuum deposition, sputtering, chemical vapor deposition (CVD), and sol-gel process employing spin coating or spray coating.

Figure 3:
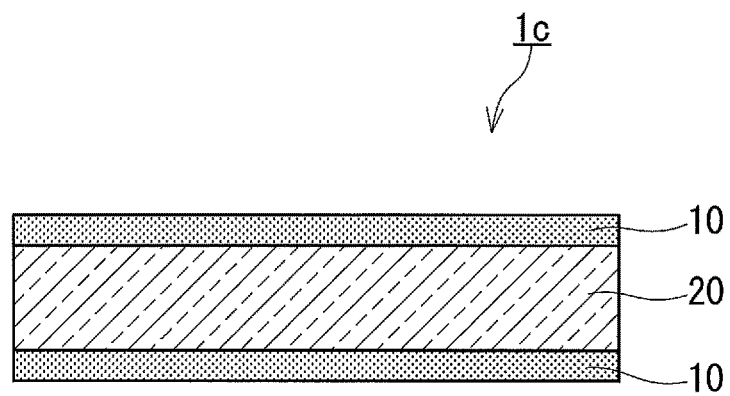
FIG. 3 is a cross-sectional view of an infrared-cut filter according to still another embodiment of the present invention.

In still another embodiment, the infrared-cut filter 1a may be modified to give an infrared-cut filter 1c as shown in FIG. 3. In the infrared-cut filter 1c, the infrared-absorbing layers 10 are formed on both principal surfaces of the transparent dielectric substrate 20. Thus, an infrared-absorbing layer thickness required of the infrared-cut filter 1c to have desired optical properties can be achieved by the two infrared-absorbing layers 10 rather than by one infrared-absorbing layer 10. The thicknesses of the infrared-absorbing layers 10 on both principal surfaces of the transparent dielectric substrate 20 may be the same or different. That is, the infrared-absorbing layers 10 are formed on both principal surfaces of the transparent dielectric substrate 20 so that the infrared-absorbing layers 10 account for equal or unequal proportions of the total thickness of the infrared-absorbing layers required of the infrared-cut filter 1c to have desired optical properties. Thus, the thickness of each of the infrared-absorbing layers 10 formed on both principal surfaces of the transparent dielectric substrate 20 is relatively small. This can prevent thickness non-uniformity which can occur when the thickness of the infrared-absorbing layer is large. Additionally, it is possible to shorten the time spent on the application of the composition for infrared-absorbing layers in a liquid form and shorten the time taken for hardening of the film of the applied composition for infrared-absorbing layers. If the infrared-absorbing layer 10 is formed only on one principal surface of the transparent dielectric substrate 20 that is very thin, the resulting infrared-cut filter may be warped due to a stress induced by contraction occurring during formation of the infrared-absorbing layer 10 from the composition for infrared-absorbing layers. The formation of the infrared-absorbing layers 10 on both principal surfaces of the transparent dielectric substrate 20 prevents warping of the infrared-cut filter 1c even when the transparent dielectric substrate 20 is very thin.

Figure 4:
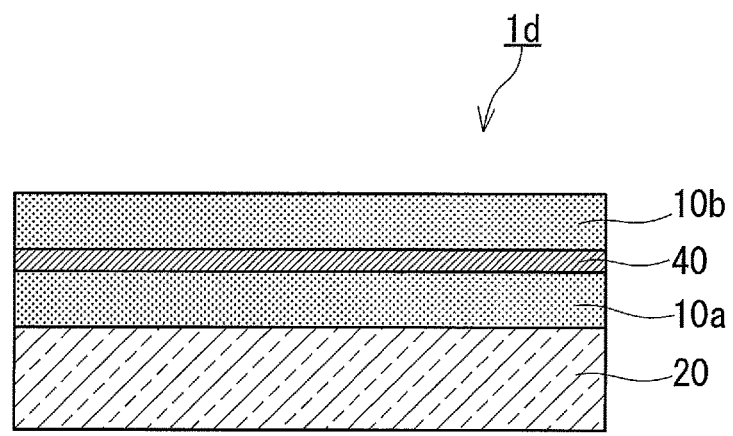
FIG. 4 is a cross-sectional view of an infrared-cut filter according to still another embodiment of the present invention.

In still another embodiment, the infrared-cut filter 1a may be modified to give an infrared-cut filter 1d as shown in FIG. 4. The infrared-cut filter 1d includes a transparent dielectric substrate 20, a first infrared-absorbing layer 10a, a second infrared-absorbing layer 10b, and an intermediate protective layer 40. The first infrared-absorbing layer 10a and the second infrared-absorbing layer 10b are formed over at least one principal surface of the transparent dielectric substrate 20 using the composition for infrared-absorbing layers according to the present invention. In the first infrared-absorbing layer 10a and second infrared-absorbing layer 10b, as in the infrared-absorbing layer 10, fine particles 11 are dispersed in a matrix 12. The transparent dielectric substrate 20 is, for example, a transparent glass substrate. The intermediate protective layer 40 is disposed between the first infrared-absorbing layer 10a and the second infrared-absorbing layer 10b.

When an infrared-cut filter suitable for use in an imaging apparatus is produced using the composition for infrared-absorbing layers according to the present invention, the thickness of an infrared-absorbing layer in the infrared-cut filter is desirably 40 to 250 μm and more desirably 100 to 200 μm. When an infrared-absorbing layer with such a thickness is formed as a single layer using the composition for infrared-absorbing layers, the flatness or smoothness of the infrared-absorbing layer may be poor. This is because during the process of hardening the film of the composition for infrared-absorbing layers by heating to form the infrared-absorbing layer, the composition for infrared-absorbing layers may be vigorously moved due to increased evaporation of solvents that may be contained in the composition for infrared-absorbing layers. Additionally, when an infrared-absorbing layer with such a thickness is formed as a single layer using the composition for infrared-absorbing layers, the fine particles may undergo aggregation which causes a decrease in transmittance or increase in haze ratio of the infrared-absorbing layer. This is because during the process of hardening the film of the composition for infrared-absorbing layers by heating to form the infrared-absorbing layer, the process progresses with uneven evaporation of the solvents in the surface of the film so that the fine particles may be aggregated.

In order to achieve good flatness or smoothness of an infrared-absorbing layer, it may be possible to form a laminate of a plurality of infrared-absorbing layers by repeating heat-induced hardening of a relatively thin film of the composition for infrared-absorbing layers a plurality of times. However, when a first infrared-absorbing layer is formed by heat-induced hardening of a film of the composition for infrared-absorbing layers on a transparent dielectric substrate such as a transparent glass substrate and then the composition for infrared-absorbing layers is applied onto the first infrared-absorbing layer to form a second infrared-absorbing layer, the applied liquid penetrates into the first infrared-absorbing layer. Thus, evaporation of the solvents from the applied liquid having penetrated into the first infrared-absorbing layer may cause cracks or delamination in the resulting infrared-absorbing layer. The same applies to the case where the third and subsequent infrared-absorbing layers are formed.

In the case of the infrared-cut filter 1d, when the first infrared-absorbing layer 10a and the second infrared-absorbing layer 10b are formed, the intermediate protective layer 40 prevents the solvents of the liquid applied to form the second infrared-absorbing layer 10b from penetrating into the first infrared-absorbing layer 10a formed in advance. Thus, an infrared-absorbing layer having good flatness or smoothness and free of cracks or delamination can be formed with a desired thickness and, in addition, a decrease in transmittance or increase in haze ratio due to aggregation of the fine particles can be prevented.

The intermediate protective layer 40 is made of a material having high visible transmittance and capable of preventing the penetration of the liquid applied to form an infrared-absorbing layer. For example, the intermediate protective layer 40 includes a hydrolysis-condensation product of an alkoxysilane as a main component. The term "main component" as used herein refers to a component whose content is highest on a mass basis in the intermediate protective layer 40. In this case, the intermediate protective layer 40 is a dense layer and can thus reliably prevent the solvents of the liquid applied to form the second infrared-absorbing layer 10b from penetrating into the first infrared-absorbing layer 10a formed in advance. Such an intermediate protective layer 40 can be formed, for example, by a sol-gel process. For example, the intermediate protective layer 40 can be formed by hydrolysis and condensation-polymerization of an alkoxysilane in a coating liquid for the intermediate protective layer 40, the coating liquid including the alkoxysilane and a solvent containing water, an alcohol, and an acid. For example, the intermediate protective layer 40 can be formed by applying the coating liquid for the intermediate protective layer 40 onto the first infrared-absorbing layer 10a and hardening the resulting film by heating. The film of the coating liquid for the intermediate protective layer 40 is formed, for example, to a thickness of several micrometers by spin coating. In the foregoing, this embodiment has been described using as an example an infrared-cut filter including two infrared-absorbing layers and an intermediate protective layer. However, an infrared-cut filter may include three or more infrared-absorbing layers and intermediate protective layers each disposed between two of the infrared-absorbing layers.

Figure 5:
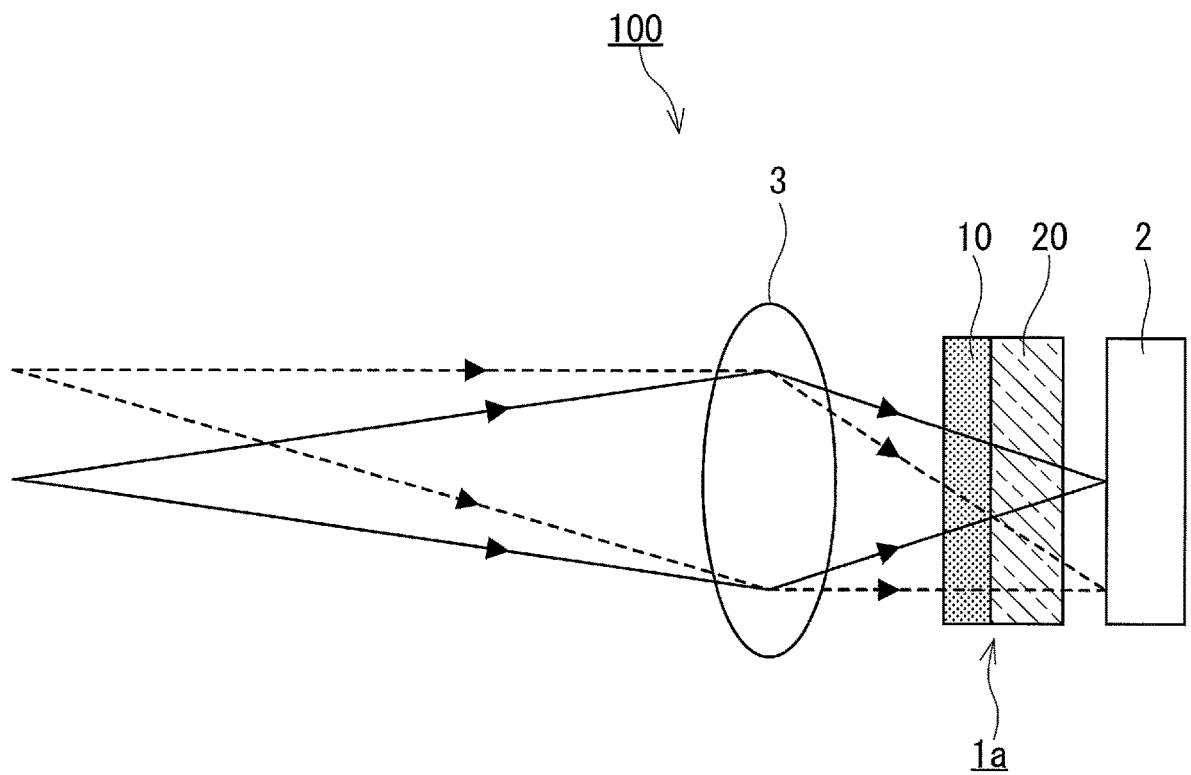
FIG. 5 shows an imaging apparatus according to an embodiment of the present invention.

In still another embodiment, the infrared-cut filter 1a is used in an imaging apparatus such as a digital camera. As shown in FIG. 5, an imaging apparatus 100 includes the infrared-cut filter 1a and an imaging sensor 2. The imaging sensor 2 is, for example, a solid-state imaging sensor such as a CCD or CMOS. The imaging apparatus 100 further includes an imaging lens 3. As shown in FIG. 5, light coming from an object is focused by the imaging lens 3, the infrared portion of the light is cut by the infrared-cut filter 1a, and then the light is incident on the imaging sensor 2. A favorable image with good color reproduction can thus be obtained. The imaging apparatus 100 may include any of the infrared-cut filter 1b, infrared-cut filter 1c, and infrared-cut filter 1d instead of the infrared-cut filter 1a.

EXAMPLES

The present invention will be described in more detail with Examples. The present invention is not limited to Examples given below. First, methods employed for evaluation in Examples will be described.

<Spectral Transmittance of Infrared-Cut Filter>

Transmittance spectra of infrared-cut filters according to Examples were measured using an ultraviolet-visible spectrophotometer (manufactured by JASCO Corporation under the product name "V-670"). In this measurement, the incident angle of light on the infrared-cut filters was set to 0° (degree). To eliminate the influence of the difference in infrared-absorbing layer thickness among the infrared-cut filters according to Examples, measured values of spectral transmittance were multiplied by 100/92 to cancel the effect of interfacial reflection, and a coefficient was determined so that the transmittance at a wavelength of 1000 nm was calculated to be 1%. Furthermore, values of transmittance at different wavelengths were converted to values of absorbance, which were corrected by multiplication by the determined coefficient. The transmittance value thus obtained was multiplied by 92/100 to calculate the spectral transmittance. Namely, the transmittance spectrum obtained for each of the infrared-cut filters according to Examples was one which was normalized so that the transmittance at a wavelength of 1000 nm was 1%. The values of spectral transmittance of the infrared-cut filters according to Examples at 400 nm and 570 nm are shown in Table 1, Table 3, and Table 4.

(Average Particle Diameter of Fine Particles)

The average particle diameter of fine particles in each of the compositions for infrared-absorbing layers according to Examples was measured by a dynamic light scattering method. A particle size analyzer manufactured by Otsuka Electronics Co., Ltd., FPAR-1000 (measurement probe: concentrated solution type probe), was used as a measurement apparatus. The results are shown in Table 1, Table 3, and Table 4.

Example 1-1

(Preparation of Composition for Infrared-Absorbing Layers)

A composition for infrared-absorbing layers according to Example 1-1 was prepared as follows. An amount of 0.225 g (1.13 millimoles (this unit will hereinafter be written as "mmol")) of copper acetate monohydrate and 12.0 g of tetrahydrofuran (THF) were mixed and stirred for 1 hour to obtain a copper acetate solution. Next, 0.180 g (0.54 mmol) of PLYSURF A208F (manufactured by DKS Co., Ltd.), which is a phosphoric acid ester compound, was added to the obtained copper acetate solution, which was stirred for 30 minutes to obtain a liquid A1. A phosphonic acid solution was separately obtained by addition of 2.0 g of THF to 0.135 g (0.98 mmol) of butylphosphonic acid, followed by stirring for 30 minutes. Next, the phosphonic acid solution was added to the liquid A1 while the liquid A1 was stirred, and the mixture was stirred at room temperature for 3 hours. Next, 4.0 g of toluene was added to the resulting solution, from which the solvents were evaporated in an 85° C. environment over 3.5 hours. After that, 0.88 g of silicone resin (manufactured by Shin-Etsu Chemical Co., Ltd. under the product name "KR-300") was added to the solution, which was stirred for 30 minutes. In this manner, the composition for infrared-absorbing layers according to Example 1-1 was obtained. PLYSURF A208F included a phosphoric acid diester represented by the formula (b1) and a phosphoric acid monoester represented by the formula (b2), and $R_{21}$, $R_{22}$, and $R_3$ in the formulae (b1) and (b2) were the same monovalent functional group represented by —$(CH_2CH_2O)_nR_4$, wherein n was 1 and $R_4$ was an alkyl group with 8 carbon atoms. The molecular weight of PLYSURF A208F was calculated by assuming that PLYSURF A208F includes the phosphoric acid diester represented by the formula (b1) and the phosphoric acid monoester represented by the formula (b2) in a molar ratio of 1:1.

(Production of Infrared-Cut Filter)

A transparent glass substrate (manufactured by Schott AG under the product name "D263") made of borosilicate glass and having a size of 76 mm×76 mm×0.21 mm was prepared, and 0.1 to 0.2 g of the composition for infrared-absorbing layers according to Example 1-1 was applied with a dispenser to a 30 mm×30 mm area of the surface of the transparent glass substrate to form a film on the transparent glass substrate. The film was heat-treated at 85° C. for 3 hours, then at 125° C. for 3 hours, then at 150° C. for 1 hour, and then at 170° C. for 4 hours. The film was thus hardened to produce an infrared-cut filter according to Example 1-1.

Example 1-2

A composition for infrared-absorbing layers according to Example 1-2 was prepared and an infrared-cut filter according to Example 1-2 was produced in the same manner as in Example 1-1, except for changing the amount of PLYSURF A208F to 0.165 g (0.50 mmol).

Example 1-3

A composition for infrared-absorbing layers according to Example 1-3 was prepared and an infrared-cut filter according to Example 1-3 was produced in the same manner as in Example 1-1, except for changing the amount of PLYSURF A208F to 0.150 g (0.45 mmol).

Example 1-4

A composition for infrared-absorbing layers according to Example 1-4 was prepared and an infrared-cut filter according to Example 1-4 was produced in the same manner as in Example 1-1, except for changing the amount of PLYSURF A208F to 0.143 g (0.43 mmol).

Example 1-5

A composition for infrared-absorbing layers according to Example 1-5 was prepared and an infrared-cut filter according to Example 1-5 was produced in the same manner as in Example 1-1, except for changing the amount of PLYSURF A208F to 0.207 g (0.62 mmol) and the amount of butylphosphonic acid to 0.127 g (0.92 mmol).

Example 1-6

A composition for infrared-absorbing layers according to Example 1-6 was prepared and an infrared-cut filter according to Example 1-6 was produced in the same manner as in Example 1-1, except for changing the amount of PLYSURF A208F to 0.297 g (0.89 mmol) and the amount of butylphosphonic acid to 0.114 g (0.83 mmol).

Example 1-7

A composition for infrared-absorbing layers according to Example 1-7 was prepared as follows. An amount of 0.225 g (1.13 mmol) of copper acetate monohydrate and 12.0 g of tetrahydrofuran (THF) were mixed and stirred for 1 hour to obtain a copper acetate solution. Next, 0.220 g (0.43 mmol) of DDP-2 (manufactured by Nikko Chemicals Co., Ltd.), which is a phosphoric acid ester compound, was added to the obtained copper acetate solution, which was stirred for 30 minutes to obtain a liquid A2. A phosphonic acid solution was separately obtained by addition of 2.0 g of THF to 0.135 g (0.98 mmol) of butylphosphonic acid, followed by stirring for 30 minutes. Next, the phosphonic acid solution was added to the liquid A2 while the liquid A2 was stirred, and the mixture was stirred at room temperature for 3 hours. Next, 4.0 g of toluene was added to the resulting solution, from which the solvents were evaporated in an 85° C. environment over 3.5 hours. Next, 0.30 g of silicone resin (manufactured by Shin-Etsu Chemical Co., Ltd. under the product name "KR-212") was added to the solution, which was stirred for 30 minutes. In this manner, the composition for infrared-absorbing layers according to Example 1-7 was obtained. DDP-2 included a phosphoric acid diester represented by the formula (b1) and a phosphoric acid monoester represented by the formula (b2), and $R_{21}$, $R_{22}$, and $R_3$ in the formulae (b1) and (b2) were the same group represented by —$(CH_2CH_2O)_nR_4$, wherein n was 2 and $R_4$ was an alkyl group with 12 to 15 carbon atoms. The molecular weight of DDP-2 was calculated by assuming that DDP-2 includes the phosphoric acid diester represented by the formula (b1) and the phosphoric acid monoester represented by the formula (b2) in a molar ratio of 1:1 and that the number of carbon atoms in $R_4$ is 13.5 which is a median between 12 and 15.

An infrared-cut filter according to Example 1-7 was produced in the same manner as in Example 1-1, except for using the composition for infrared-absorbing layers according to Example 1-7 instead of the composition for infrared-absorbing layers according to Example 1-1.

Example 1-8

A composition for infrared-absorbing layers according to Example 1-8 was prepared and an infrared-cut filter according to Example 1-8 was produced in the same manner as in Example 1-7, except for using, instead of DDP-2, 0.33 g (0.42 mmol) of DDP-6 (manufactured by Nikko Chemicals Co., Ltd.) which is a phosphoric acid ester compound. DDP-6 included a phosphoric acid diester represented by the formula (b1) and a phosphoric acid monoester represented by the formula (b2), and $R_{21}$, $R_{22}$, and $R_3$ in the formulae (b1) and (b2) were the same group represented by —$(CH_2CH_2O)_nR_4$, wherein n was 6 and $R_4$ was an alkyl group with 12 to 15 carbon atoms. The molecular weight of DDP-6 was calculated by assuming that DDP-6 includes the phosphoric acid diester represented by the formula (b1) and the phosphoric acid monoester represented by the formula (b2) in a molar ratio of 1:1 and that the number of carbon atoms in $R_4$ is 13.5 which is a median between 12 and 15.

Example 1-9

A composition for infrared-absorbing layers according to Example 1-9 was prepared and an infrared-cut filter according to Example 1-9 was produced in the same manner as in Example 1-1, except for changing the amount of PLYSURF A208F to 0.132 g (0.40 mmol).

Comparative Example 1-1

Preparation of a composition for infrared-absorbing layers was attempted in the same manner as in Example 1-1, except for changing the amount of PLYSURF A208F to 0.115 g (0.35 mmol). Aggregation occurred in the dispersion, leading to a failure to obtain a liquid composition with high transparency.

Comparative Example 1-2

Preparation of a composition for infrared-absorbing layers was attempted in the same manner as in Example 1-1, except for changing the amount of PLYSURF A208F to 0.099 g (0.30 mmol). Aggregation occurred in the dispersion, leading to a failure to obtain a liquid composition with high transparency.

Comparative Example 1-3

Preparation of a composition for infrared-absorbing layers was attempted in the same manner as in Example 1-1, except for changing the amount of PLYSURF A208F to 0.074 g (0.22 mmol) and the amount of butylphosphonic acid to 0.145 g (1.05 mmol). Aggregation occurred in the dispersion, leading to a failure to obtain a liquid composition with high transparency.

Comparative Example 1-4

Preparation of a composition for infrared-absorbing layers was attempted in the same manner as in Example 1-1, except for changing the amount of PLYSURF A208F to 0.116 g (0.35 mmol) and the amount of butylphosphonic acid to 0.132 g (0.96 mmol). Aggregation occurred in the dispersion, leading to a failure to obtain a liquid composition with high transparency.

Comparative Example 1-5

Preparation of a composition for infrared-absorbing layers was attempted in the same manner as in Example 1-1, except for changing the amount of PLYSURF A208F to 0.165 g (0.50 mmol) and the amount of butylphosphonic acid to 0.172 g (1.25 mmol). Aggregation occurred in the dispersion, leading to a failure to obtain a liquid composition with high transparency.

Comparative Example 1-6

Preparation of a composition for infrared-absorbing layers was attempted in the same manner as in Example 1-1, except for changing the amount of PLYSURF A208F to 0.116 g (0.35 mmol) and the amount of butylphosphonic acid to 0.172 g (1.25 mmol). Aggregation occurred in the dispersion, leading to a failure to obtain a liquid composition with high transparency.

<Evaluation>

Figure 6:
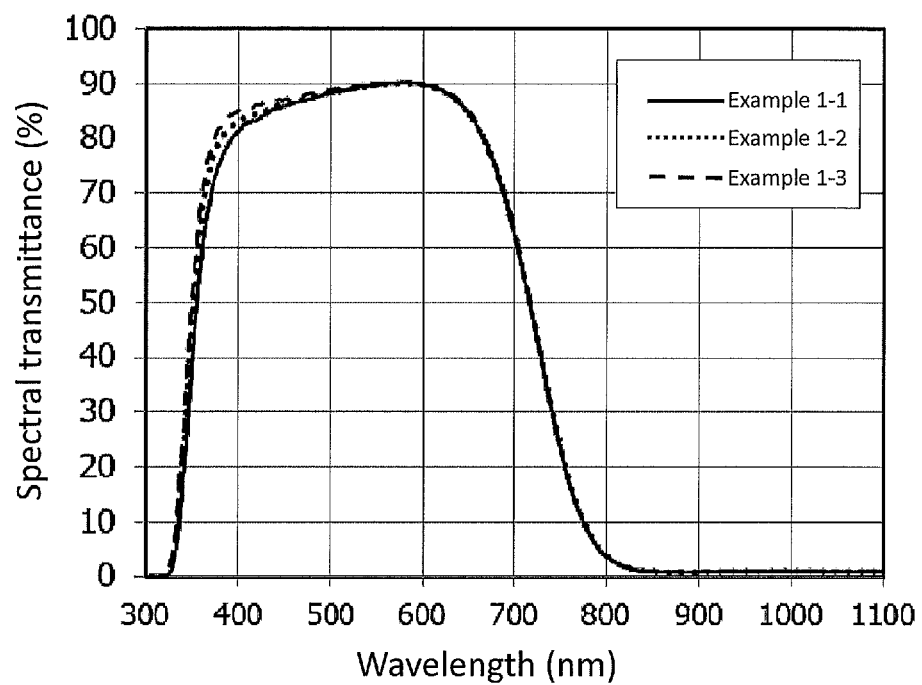
FIG. 6 is a graph showing transmittance spectra of infrared-cut filters according to Examples 1-1 to 1-3.

The conditions for preparation of the compositions for infrared-absorbing layers according to Examples 1-1 to 1-9 are shown in Table 1, and the conditions for preparation of compositions in Comparative Examples 1-1 to 1-6 are shown in Table 2. Transmittance spectra of the infrared-cut filters according to Example 1-1, Example 1-2, and Example 1-3 are shown in FIG. 6.

Figure 7:
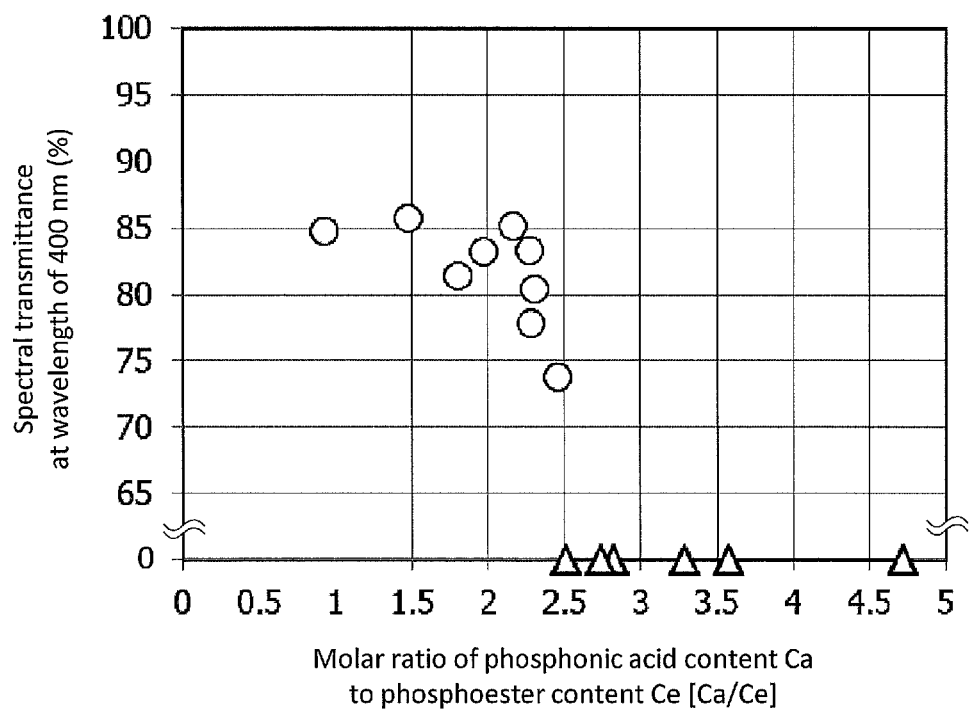
FIG. 7 is a graph showing, for infrared-cut filters according to Examples 1-1 to 1-9 and for Comparative Examples 1-1 to 1-6, the relationship between the transmittance at a wavelength of 400 nm and the molar ratio [Ca/Ce] of the phosphonic acid content Ca to the phosphoric acid ester content Ce.

For the infrared-cut filters according to Examples 1-1 to 1-9, the relationship between the spectral transmittance at a wavelength of 400 nm and the molar ratio (Ca/Ce) of the phosphonic acid (butylphosphonic acid) content Ca to the phosphoric acid ester content Ce is shown in FIG. 7. In FIG. 7, the values plotted as circles represent the results for Examples. For reference, the values of the molar ratio (Ca/Ce) of the phosphonic acid (butylphosphonic acid) content Ca to the phosphoric acid ester content Ce in Comparative Examples 1-1 to 1-6 are plotted as triangles on the horizontal axis in FIG. 7, although in Comparative Examples 1-1 to 1-6, the fine particles were aggregated in the liquid so that a transparent liquid composition for infrared-absorbing layers was not obtained.

Figure 8:
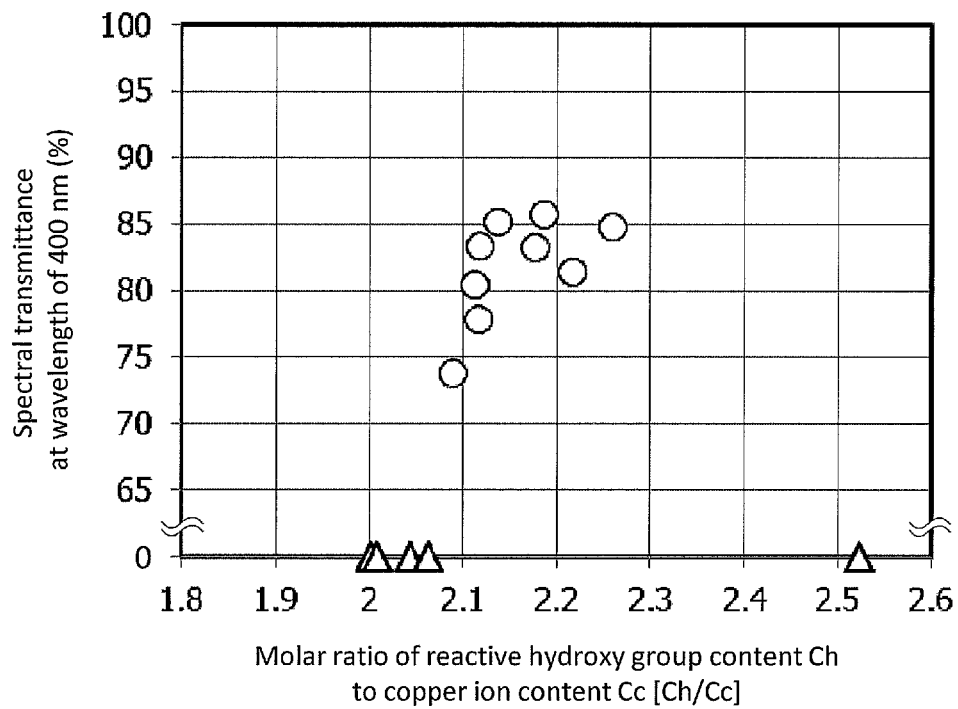
FIG. 8 is a graph showing, for the infrared-cut filters according to Examples 1-1 to 1-9 and for Comparative Examples 1-1 to 1-6, the relationship between the transmittance at a wavelength of 400 nm and the molar ratio [Ch/Cc] of the reactive hydroxy group content Ch to the copper ion content Cc.

For the infrared-cut filters according to Examples 1-1 to 1-9, the relationship between the spectral transmittance at a wavelength of 400 nm and the molar ratio (Ch/Cc) of the reactive hydroxy group content Ch to the copper ion content Cc is shown in FIG. 8. In FIG. 8, the values plotted as circles represent the results for Examples. For reference, the values of the molar ratio (Ch/Cc) of the reactive hydroxy group content Ch to the copper ion content Cc in Comparative Examples 1-1 to 1-6 (excluding Comparative Example 1-5) are plotted as triangles on the horizontal axis in FIG. 8.

As shown in Table 1, Table 2, and FIG. 7, when Ca/Ce was more than 2.5, the formation of an infrared-absorbing layer was difficult because the fine particles were aggregated and were not properly dispersed in the liquid. To allow the phosphoric acid ester to exhibit desired performance as a dispersant, Ca/Ce is desirably less than 2.5. As shown in FIG. 8, it was suggested that the closer Ch/Cc is to 2.2, the higher the spectral transmittance of an infrared-cut filter at a wavelength of 400 nm is. It is believed that when Ch/Cc is close to 2.2, the phosphonic acid and phosphoric acid ester stably coordinate to copper ion via hydroxy groups present in the molecules of the phosphonic acid and phosphoric acid ester. It was suggested that when Ch/Cc is in the range of 2.08 to 2.3, an infrared-cut filter exhibiting a high spectral transmittance at a wavelength of 400 nm can be obtained, and that when Ch/Cc falls within the range of 2.1 to 2.3, an infrared-cut filter exhibiting a spectral transmittance more than 75% at a wavelength of 400 nm can be obtained. Namely, it was suggested that Ch/Cc desirably falls within the range of 2.1 to 2.3. It was also suggested that when Ch/Cc is less than 2.08 or more than 2.5, the formation of an infrared-absorbing layer is difficult because the fine particles formed by the copper ion and phosphonic acid are aggregated in the liquid and become poorly dispersible.

Example 2-1

(Preparation of Composition for Infrared-Absorbing Layers)
A composition for infrared-absorbing layers according to Example 2-1 was prepared as follows. An amount of 0.225 g (1.13 mmol) of copper acetate monohydrate and 12.0 g of tetrahydrofuran (THF) were mixed and stirred for 1 hour to obtain a copper acetate solution. Next, 0.297 g (0.89 mmol) of PLYSURF A208F (manufactured by DKS Co., Ltd.), which is a phosphoric acid ester compound, was added to the obtained copper acetate solution, which was stirred for 30 minutes to obtain a liquid A3. A phosphoric acid solution was separately obtained by addition of 0.90 g of THF to 0.10 g of phosphoric acid. Furthermore, a phosphonic acid solution was obtained by addition of 2.0 g of THF to 0.105 g (0.76 mmol) of butylphosphonic acid, followed by stirring for 30 minutes. Next, 0.05 g of the phosphoric acid solution (phosphoric acid content: 0.05 mmol) was added to the liquid A3 while the liquid A3 was stirred. The phosphonic acid solution was further added, and the resulting mixture was stirred at room temperature for 3 hours. Next, 4.0 g of toluene was added to the resulting solution, from which the solvents were evaporated in an 85° C. environment over 3.5 hours. Next, 0.88 g of silicone resin (manufactured by Shin-Etsu Chemical Co., Ltd. under the product name "KR-300") was added to the solution, which was stirred for 30 minutes. In this manner, the composition for infrared-absorbing layers according to Example 2-1 was obtained.
(Production of Infrared-Cut Filter)

A transparent glass substrate (manufactured by Schott AG under the product name "D263") made of borosilicate glass and having a size of 76 mm×76 mm×0.21 mm was prepared, and 0.1 to 0.2 g of the composition for infrared-absorbing layers according to Example 2-1 was applied with a dispenser to a 30 mm×30 mm area of the surface of the transparent glass substrate to form a film on the transparent glass substrate. The film was heat-treated at 85° C. for 3 hours, then at 125° C. for 3 hours, and then at 150° C. for 1 hour. The film was thus hardened to produce an infrared-cut filter according to Example 2-1.

Example 2-2

A composition for infrared-absorbing layers according to Example 2-2 was prepared and an infrared-cut filter according to Example 2-2 was produced in the same manner as in Example 2-1, except for changing the amount of PLYSURF A208F to 0.223 g (0.67 mmol) and the amount of butylphosphonic acid to 0.114 g (0.83 mmol).

Example 2-3

A composition for infrared-absorbing layers according to Example 2-3 was prepared and an infrared-cut filter according to Example 2-3 was produced in the same manner as in Example 2-1, except for changing the amount of PLYSURF A208F to 0.149 g (0.45 mmol) and the amount of butylphosphonic acid to 0.123 g (0.89 mmol).

Example 2-4

A composition for infrared-absorbing layers according to Example 2-4 was prepared and an infrared-cut filter according to Example 2-4 was produced in the same manner as in Example 2-1, except for changing the amount of PLYSURF A208F to 0.223 g (0.67 mmol) and the amount of butylphosphonic acid to 0.129 g (0.93 mmol).

Example 2-5

A composition for infrared-absorbing layers according to Example 2-5 was prepared and an infrared-cut filter according to Example 2-5 was produced in the same manner as in Example 2-1, except for changing the amount of PLYSURF A208F to 0.223 g (0.67 mmol) and the amount of butylphosphonic acid to 0.122 g (0.88 mmol).

Example 2-6

A composition for infrared-absorbing layers according to Example 2-6 was prepared and an infrared-cut filter according to Example 2-6 was produced in the same manner as in Example 2-1, except for changing the amount of PLYSURF A208F to 0.223 g (0.67 mmol) and the amount of butylphosphonic acid to 0.106 g (0.77 mmol).

Example 2-7

A composition for infrared-absorbing layers according to Example 2-7 was prepared and an infrared-cut filter according to Example 2-7 was produced in the same manner as in Example 2-1, except for changing the amount of PLYSURF A208F to 0.223 g (0.67 mmol), the amount of butylphosphonic acid to 0.099 g (0.72 mmol), and the amount of the phosphoric acid solution to 0.12 g (phosphoric acid content: 0.12 mmol).

Example 2-8

A composition for infrared-absorbing layers according to Example 2-8 was prepared and an infrared-cut filter according to Example 2-8 was produced in the same manner as in Example 2-1, except for changing the amount of PLYSURF A208F to 0.223 g (0.67 mmol), the amount of butylphosphonic acid to 0.076 g (0.55 mmol), and the amount of the phosphoric acid solution to 0.23 g (phosphoric acid content: 0.23 mmol).

Comparative Example 2-1

Preparation of a composition for infrared-absorbing layers was attempted in the same manner as in Example 2-1, except for changing the amount of PLYSURF A208F to 0.223 g (0.67 mmol) and the amount of butylphosphonic acid to 0.250 g (1.81 mmol). Aggregation occurred in the dispersion, leading to a failure to obtain a liquid composition with high transparency.

Comparative Example 2-2

Preparation of a composition for infrared-absorbing layers was attempted in the same manner as in Example 2-1, except for changing the amount of PLYSURF A208F to 0.100 g (0.30 mmol) and the amount of butylphosphonic acid to 0.122 g (0.88 mmol). Aggregation occurred in the dispersion, leading to a failure to obtain a liquid composition with high transparency.

<Evaluation>

Figure 9:
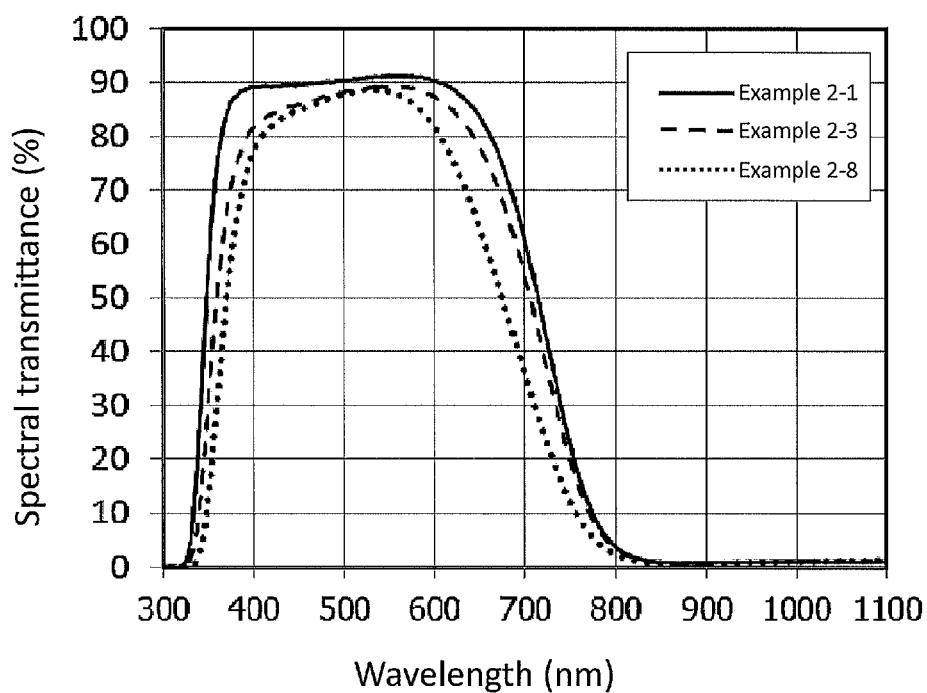
FIG. 9 is a graph showing transmittance spectra of infrared-cut filters according to Example 2-1, Example 2-3, and Example 2-8.

The conditions for preparation of compositions in Examples 2-1 to 2-8 and Comparative Examples 2-1 and 2-2 are shown in Table 3. Transmittance spectra of the infrared-cut filters according to Example 2-1, Example 2-3, and Example 2-8 are shown in FIG. 9.

Figure 10:
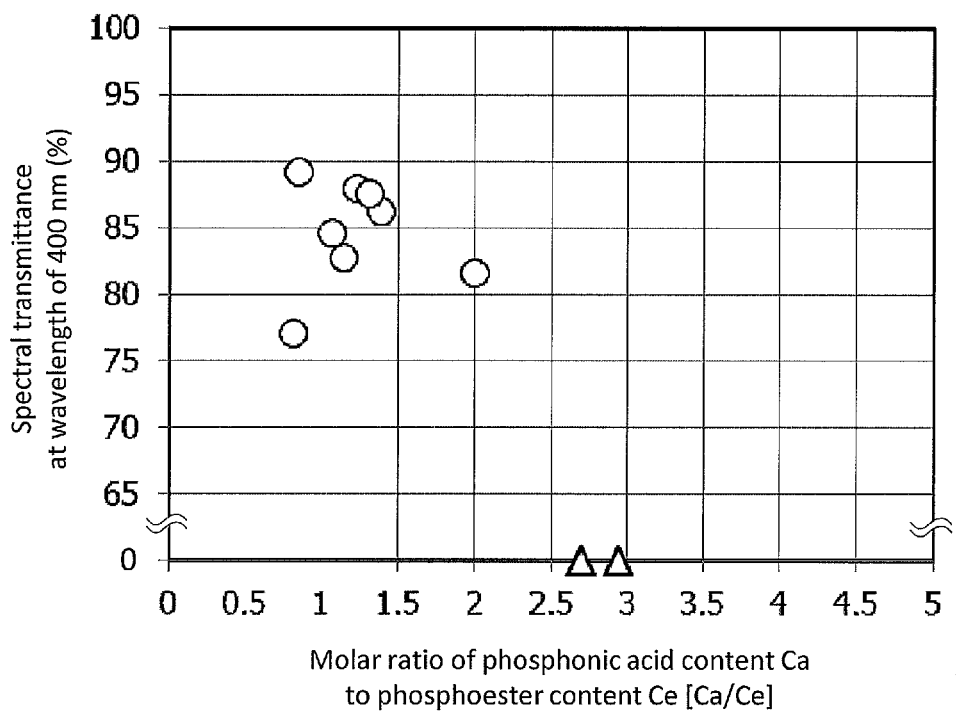
FIG. 10 is a graph showing, for infrared-cut filters according to Examples 2-1 to 2-8 and for Comparative Examples 2-1 and 2-2, the relationship between the transmittance at a wavelength of 400 nm and the molar ratio [Ca/Ce] of the phosphonic acid content Ca to the phosphoric acid ester content Ce.

For the infrared-cut filters according to Examples 2-1 to 2-8, the relationship between the spectral transmittance at a wavelength of 400 nm and the molar ratio (Ca/Ce) of the phosphonic acid (butylphosphonic acid) content Ca to the phosphoric acid ester content Ce is shown in FIG. 10. In FIG. 10, the values plotted as circles represent the results for Examples. For reference, the values of the molar ratio (Ca/Ce) of the phosphonic acid (butylphosphonic acid) content Ca to the phosphoric acid ester content Ce in Comparative Examples 2-1 and 2-2 are plotted as triangles on the horizontal axis in FIG. 10.

Figure 11:
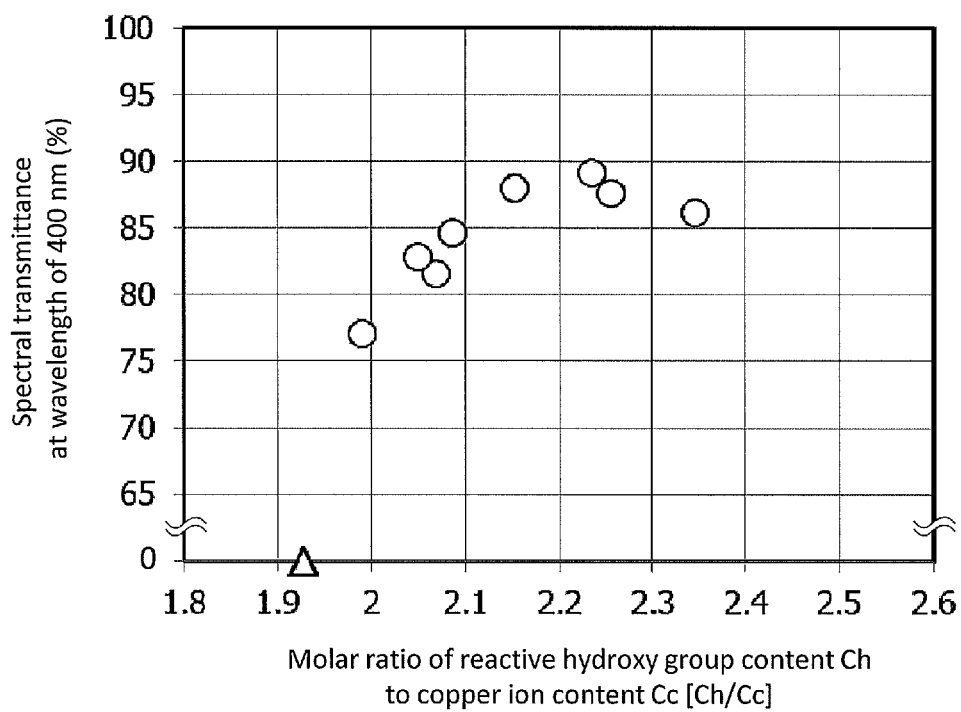
FIG. 11 is a graph showing, for the infrared-cut filters according to Examples 2-1 to 2-8 and for Comparative Examples 2-1 and 2-2, the relationship between the transmittance at a wavelength of 400 nm and the molar ratio [Ch/Cc] of the reactive hydroxy group content Ch to the copper ion content Cc.

For the infrared-cut filters according to Examples 2-1 to 2-8, the relationship between the spectral transmittance at a wavelength of 400 nm and the molar ratio (Ch/Cc) of the reactive hydroxy group content Ch to the copper ion content Cc is shown in FIG. 11. In FIG. 11, the values plotted as circles represent the results for Examples. For reference, the value of the molar ratio (Ch/Cc) of the reactive hydroxy group content Ch to the copper ion content Cc in Comparative Example 2-2 is plotted as a triangle on the horizontal axis in FIG. 11.

As shown in Table 3 and FIG. 10, when Ca/Ce was more than 2.5, the formation of an infrared-absorbing layer was difficult because the fine particles were aggregated and were not properly dispersed in the liquid. As shown in FIG. 11, it was suggested that the closer Ch/Cc is to 2.2, the higher the spectral transmittance of an infrared-cut filter at 400 nm is. This trend observed in Examples 2-1 to 2-8 was more marked than the same trend observed in Examples 1-1 to 1-9. It is believed that when Ch/Cc is close to 2.2, the phosphonic acid, phosphoric acid ester, and phosphoric acid stably coordinate to copper ion via hydroxy groups present in the molecules of the phosphonic acid, phosphoric acid ester, and phosphoric acid. It was suggested that when Ch/Cc is 2 or more, an infrared-cut filter exhibiting a spectral transmittance more than 80% at a wavelength of 400 nm can be obtained, and that when Ch/Cc is in the range of 2.1 to 2.35, an infrared-cut filter stably exhibiting a spectral transmittance more than 85% at a wavelength of 400 nm can be obtained. Namely, it was suggested that Ch/Cc is more desirably in the range of 2.1 to 2.35. It was also suggested that the spectral transmittance at a wavelength of 400 nm can be 75% or more even when Ch/Cc is in the range of 1.95 to 2.1. It was further suggested that when Ch/Cc is less than 1.95, the formation of an infrared-absorbing layer is difficult because the fine particles formed by the copper ion and phosphonic acid are aggregated and become poorly dispersible.

Example 3-1

(Preparation of Composition for Infrared-Absorbing Layers)

A composition for infrared-absorbing layers according to Example 3-1 was prepared as follows. An amount of 0.225 g (1.13 mmol) of copper acetate monohydrate and 12.0 g of THF were mixed and stirred for 1 hour to obtain a copper acetate solution. Next, 0.165 g (0.50 mmol) of PLYSURF A208F (manufactured by DKS Co., Ltd.), which is a phosphoric acid ester compound, was added to the obtained copper acetate solution, which was stirred for 30 minutes to obtain a liquid A4. A phosphonic acid solution was separately obtained by addition of 2.0 g of THF to 0.105 g (0.95 mmol) of ethylphosphonic acid, followed by stirring for 30 minutes. Next, the phosphonic acid solution was added to the liquid A4 while the liquid A4 was stirred, and the mixture was stirred at room temperature for 16 hours. Next, 4.0 g of toluene was added to the resulting solution, from which the solvents were evaporated in an 85° C. environment over 3.5 hours. Subsequently, 0.88 g of silicone resin (manufactured by Shin-Etsu Chemical Co., Ltd. under the product name "KR-300") was added to the solution, which was stirred for 30 minutes. In this manner, the composition for infrared-absorbing layers according to Example 3-1 was obtained.

(Production of Infrared-Cut Filter)

A transparent glass substrate (manufactured by Schott AG under the product name "D263") made of borosilicate glass and having a size of 76 mm×76 mm×0.21 mm was prepared, and 0.1 to 0.2 g of the composition for infrared-absorbing layers according to Example 3-1 was applied with a dispenser to a 30 mm×30 mm area of the surface of the transparent glass substrate to form a film on the transparent glass substrate. The film was heat-treated at 85° C. for 3 hours, then at 125° C. for 3 hours, then at 150° C. for 1 hour, and then at 170° C. for 4 hours. The film was thus hardened to produce an infrared-cut filter according to Example 3-1.

Example 3-2

A composition for infrared-absorbing layers according to Example 3-2 was prepared and an infrared-cut filter according to Example 3-2 was produced in the same manner as in Example 3-1, except for changing the amount of PLYSURF A208F to 0.190 g (0.57 mmol).

Example 3-3

A composition for infrared-absorbing layers according to Example 3-3 was prepared and an infrared-cut filter according to Example 3-3 was produced in the same manner as in Example 3-1, except for changing the amount of PLYSURF A208F to 0.215 g (0.65 mmol).

Comparative Example 3-1

Preparation of a composition for infrared-absorbing layers was attempted in the same manner as in Example 3-1, except for changing the amount of PLYSURF A208F to 0.120 g (0.36 mmol). Aggregation occurred in the dispersion, leading to a failure to obtain a liquid composition with high transparency.

<Evaluation>

Figure 12:
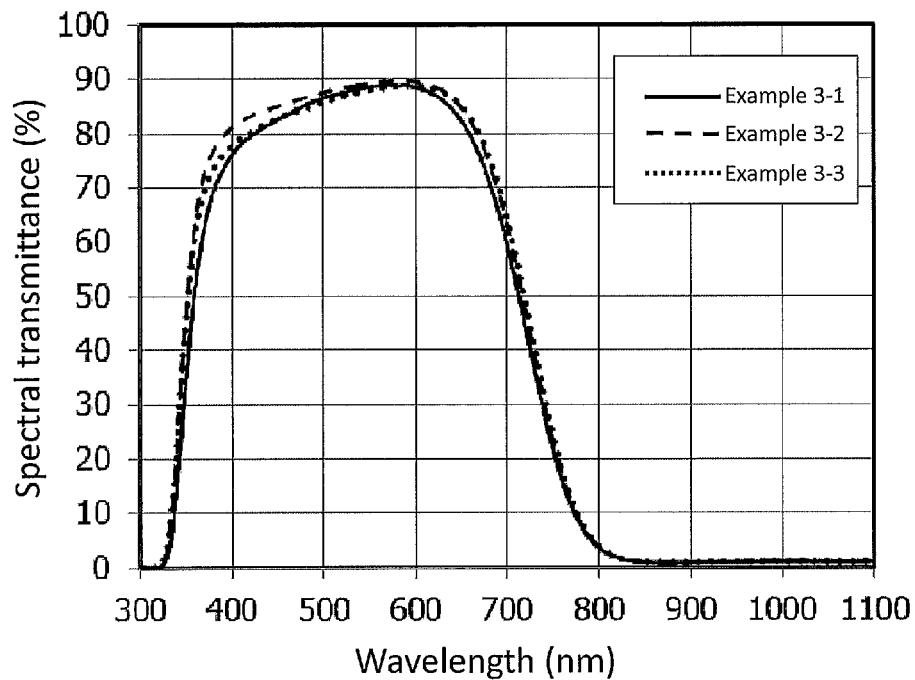
FIG. 12 is a graph showing transmittance spectra of infrared-cut filters according to Example 3-1, Example 3-2, and Example 3-3 at a wavelength of 400 nm.

The conditions for preparation of compositions in Examples 3-1 to 3-3 and Comparative Example 3-1 are shown in Table 4. Transmittance spectra of the infrared-cut filters according to Example 3-1, Example 3-2, and Example 3-3 are shown in FIG. 12.

Figure 13:
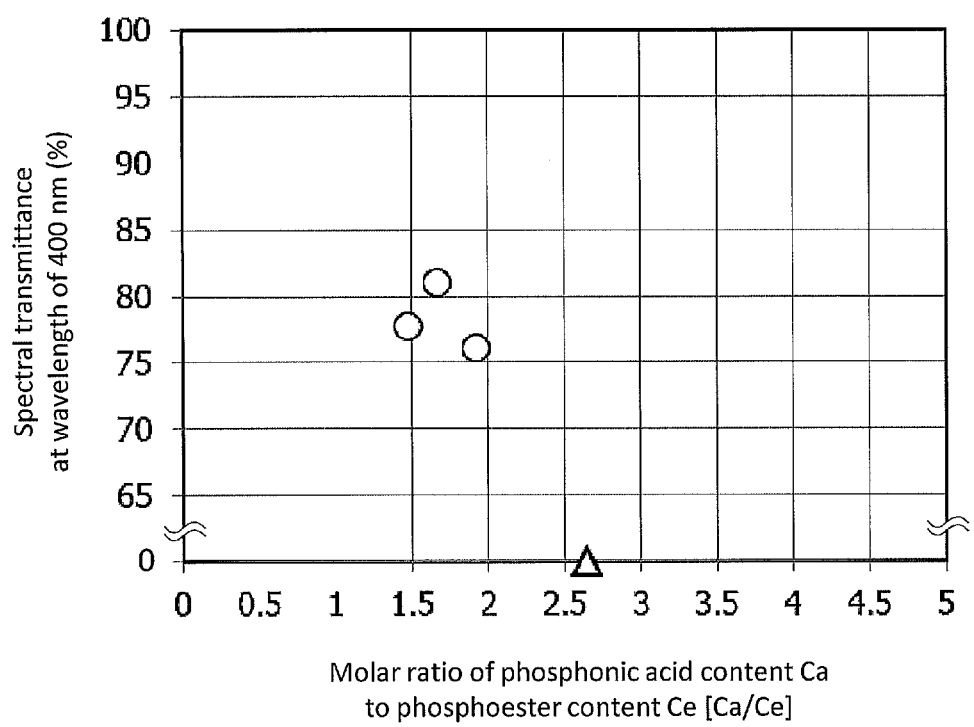
FIG. 13 is a graph showing, for infrared-cut filters according to Examples 3-1 to 3-3 and for Comparative Example 3-1, the relationship between the transmittance at a wavelength of 400 nm and the molar ratio [Ca/Ce] of the phosphonic acid content Ca to the phosphoric acid ester content Ce.

For the infrared-cut filters according to Examples 3-1 to 3-3, the relationship between the spectral transmittance at a wavelength of 400 nm and the molar ratio (Ca/Ce) of the phosphonic acid (ethylphosphonic acid) content Ca to the phosphoric acid ester content Ce is shown in FIG. 13. In FIG. 13, the values plotted as circles represent the results for Examples. For reference, the value of the molar ratio (Ca/Ce) of the phosphonic acid (ethylphosphonic acid) content Ca to the phosphoric acid ester content Ce in Comparative Example 3-1 is plotted as a triangle on the horizontal axis in FIG. 13.

Figure 14:
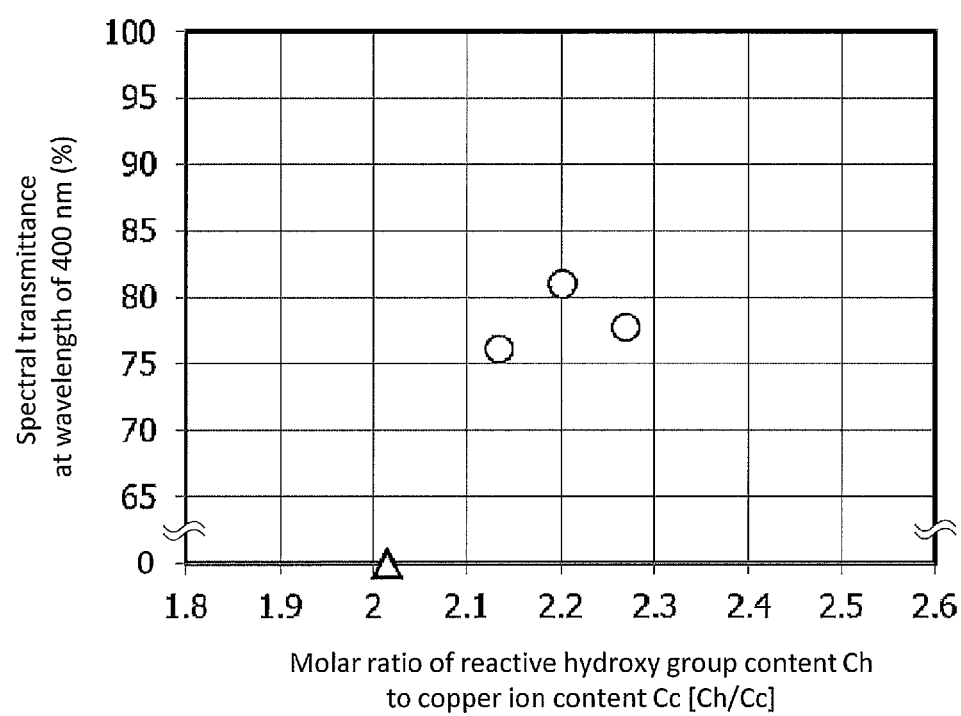
FIG. 14 is a graph showing, for the infrared-cut filters according to Examples 3-1 to 3-3 and for Comparative Example 3-1, the relationship between the transmittance at a wavelength of 400 nm and the molar ratio [Ch/Cc] of the reactive hydroxy group content Ch to the copper ion content Cc.

For the infrared-cut filters according to Examples 3-1 to 3-3, the relationship between the spectral transmittance at a wavelength of 400 nm and the molar ratio (Ch/Cc) of the reactive hydroxy group content Ch to the copper ion content Cc is shown in FIG. 14. In FIG. 14, the values plotted as circles represent the results for Examples. For reference, the value of the molar ratio (Ch/Cc) of the reactive hydroxy group content Ch to the copper ion content Cc in Comparative Example 3-1 is plotted as a triangle on the horizontal axis in FIG. 14.

As shown in Table 4 and FIG. 13, when Ca/Ce was more than 2.5, the formation of an infrared-absorbing layer was difficult because the fine particles were aggregated and were not properly dispersed in the liquid. As shown in FIG. 14, it was suggested that the closer Ch/Cc is to 2.2, the higher the spectral transmittance of an infrared-cut filter at a wavelength of 400 nm is. It is believed that when Ch/Cc is close to 2.2, the phosphonic acid and phosphoric acid ester stably coordinate to copper ion via hydroxy groups present in the molecules of the phosphonic acid and phosphoric acid ester. It was suggested that when Ch/Cc is in the range of 2.08 to 2.3, an infrared-cut filter exhibiting a high spectral transmittance at a wavelength of 400 nm can be obtained, and that when Ch/Cc is in the range of 2.1 to 2.3, the spectral transmittance at a wavelength of 400 nm can exceed 75%. Namely, it was suggested that Ch/Cc is particularly desirably in the range of 2.1 to 2.3. It was also suggested that when Ch/Cc is less than 2.1, the formation of an infrared-absorbing layer is difficult because the fine particles formed by the copper ion and phosphonic acid are aggregated and become poorly dispersible.

Example 4-1

A transparent glass substrate (manufactured by Schott AG under the product name "D263") made of borosilicate glass and having a size of 76 mm×76 mm×0.21 mm was prepared, and about 1.6 g of the composition for infrared-absorbing layers according to Example 1-4 was applied with a dispenser to a given area of the surface of the transparent glass substrate to form a film on the transparent glass substrate. The film was heat-treated at 85° C. for 3 hours, then at 125° C. for 3 hours, and then at 150° C. for 1 hour. The film was thus hardened to obtain an infrared-cut filter A. A 25 mm×25 mm portion of the infrared-cut filter A was cut out and obtained as an infrared-cut filter according to Example 4-1-A. Next, the infrared-cut filter A remaining after cutting was further heat-treated at 170° C. for 4 hours to obtain an infrared-cut filter B. A 25 mm×25 mm portion of the infrared-cut filter B was cut out and obtained as an infrared-cut filter according to Example 4-1-B. Next, the infrared-cut filter B remaining after cutting was further heat-treated at 170° C. for 5 hours to obtain an infrared-cut filter C. A 25 mm×25 mm portion of the infrared-cut filter C was cut out and obtained as an infrared-cut filter according to Example 4-1-C. Namely, the infrared-cut filter according to Example 4-1-A was produced through heat treatment at 85° C. for 3 hours, then at 125° C. for 3 hours, and then at 150° C. for 1 hour, the infrared-cut filter according to Example 4-1-B was produced through heat treatment at 85° C. for 3 hours, then at 125° C. for 3 hours, then at 150° C. for 1 hour, and then at 170° C. for 4 hours, and the infrared-cut filter according to Example 4-1-C was produced through heat treatment at 85° C. for 3 hours, then at 125° C. 3 hours, then at 150° C. for 1 hour, and then at 170° C. for 9 hours.

<Evaluation>

Figure 15A:
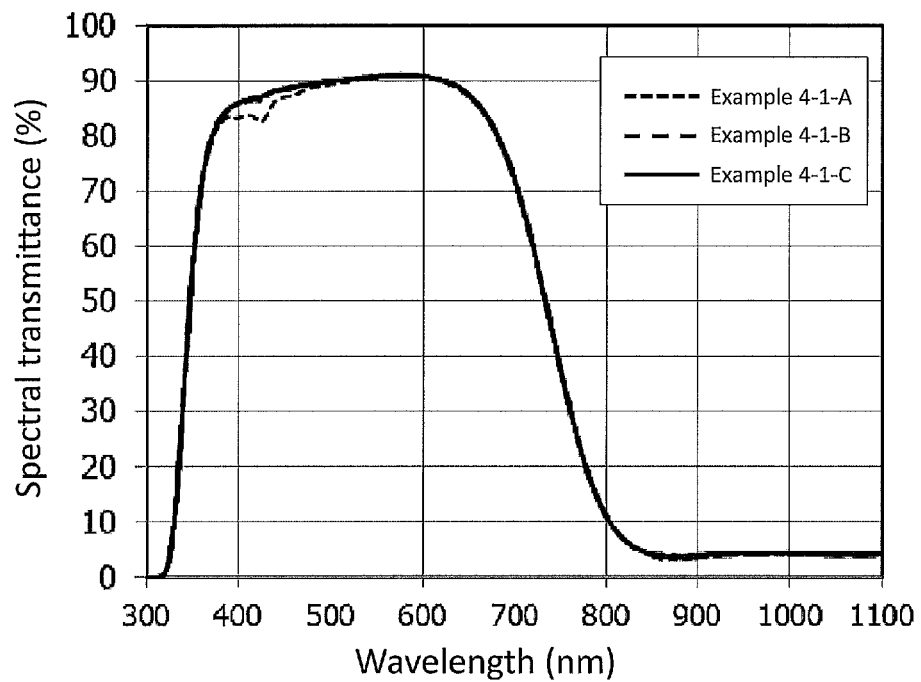
FIG. 15A shows transmittance spectra of infrared-cut filters according to Examples 4-1-A to 4-1-C.
Figure 15B:
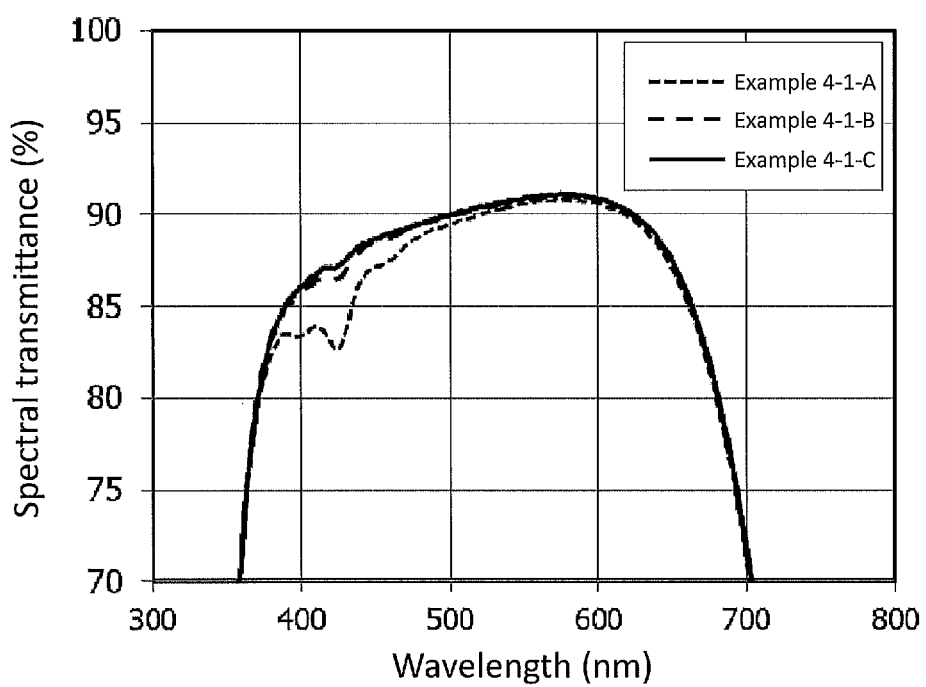
FIG. 15B shows enlarged visible portions of the transmittance spectra shown in FIG. 15A for the infrared-cut filters according to Examples 4-1-A to 4-1-C.

Transmittance spectra of the infrared-cut filters according to Example 4-1-A, Example 4-1-B, and Example 4-1-C are shown in FIG. 15A and FIG. 15B. The spectral transmittances of the infrared-cut filters according to Example 4-1-A, Example 4-1-B, and Example 4-1-C at a wavelength of 400 nm were 83.4%, 85.8%, and 86.1%, respectively. It was suggested that increasing the time of heating at a high temperature results in increases in spectral transmittances in the visible region, including the spectral transmittance at a wavelength of 400 nm.

Example 4-2

A transparent glass substrate (manufactured by Schott AG under the product name "D263") made of borosilicate glass and having a size of 76 mm×76 mm×0.21 mm was prepared, and about 1.6 g of the composition for infrared-absorbing layers according to Example 1-5 was applied with a dispenser to a given area of the surface of the transparent glass substrate to form a film on the transparent glass substrate. The film was heat-treated at 85° C. for 3 hours, then at 125° C. for 3 hours, and then at 150° C. for 1 hour. The film was thus hardened to obtain an infrared-cut filter D. A 25 mm×25 mm portion of the infrared-cut filter D was cut out and obtained as an infrared-cut filter according to Example 4-2-A. Next, the infrared-cut filter D remaining after cutting was further heat-treated at 170° C. for 4 hours to obtain an infrared-cut filter E. A 25 mm×25 mm portion of the infrared-cut filter E was cut out and obtained as an infrared-cut filter according to Example 4-2-B. Namely, the infrared-cut filter according to Example 4-2-A was produced through heat treatment at 85° C. for 3 hours, then at 125° C. for 3 hours, and then at 150° C. for 1 hour, and the infrared-cut filter according to Example 4-2-B was produced through heat treatment at 85° C. for 3 hours, then at 125° C. for 3 hours, then at 150° C. for 1 hour, and then at 170° C. for 4 hours.

<Evaluation>

Figure 16A:
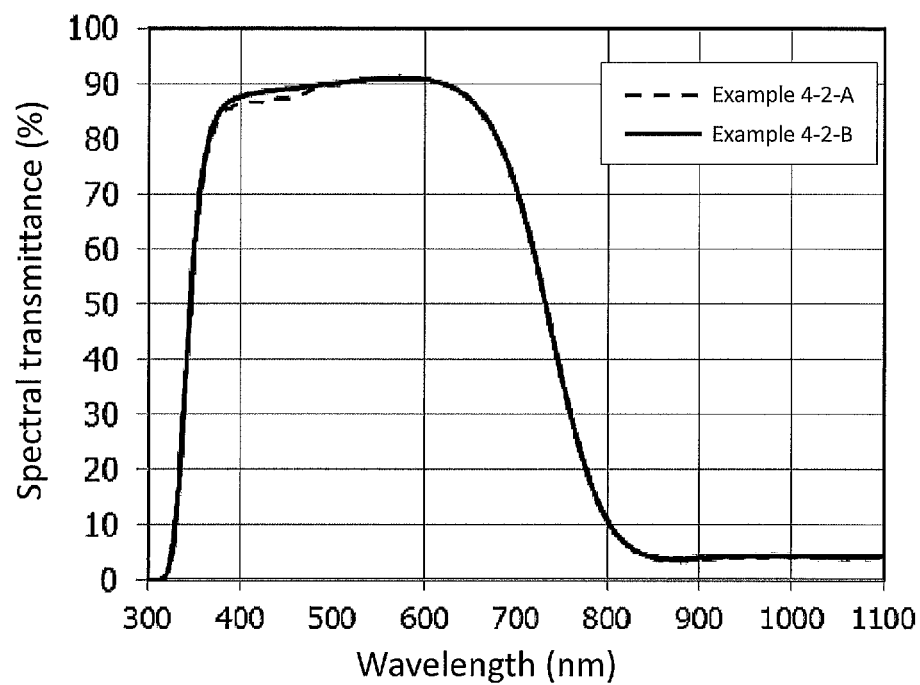
FIG. 16A shows transmittance spectra of infrared-cut filters according to Example 4-2-A and Example 4-2-B.
Figure 16B:
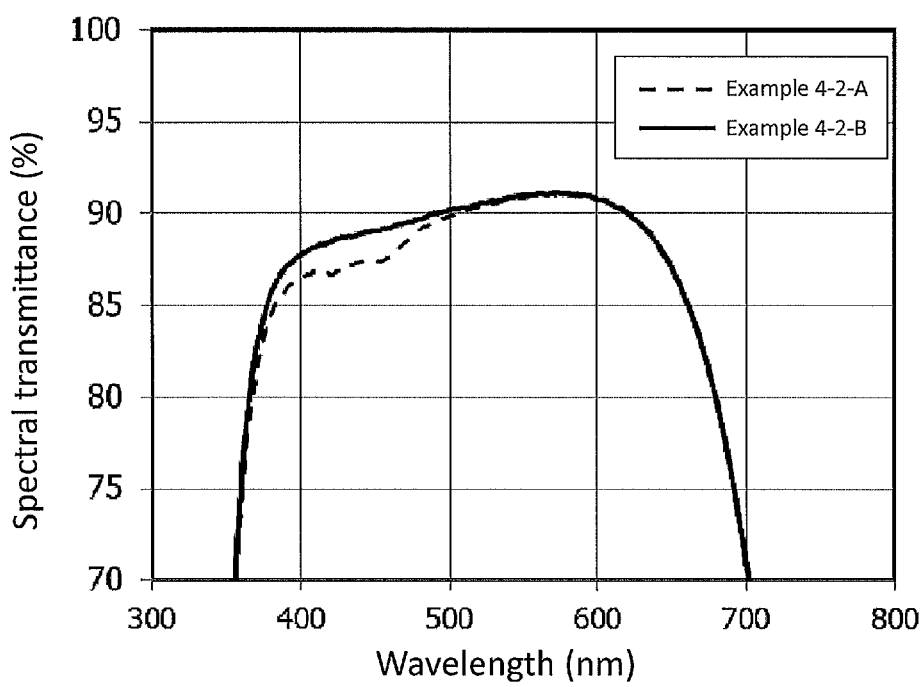
FIG. 16B shows enlarged visible portions of the transmittance spectra shown in FIG. 16A for the infrared-cut filters according to Example 4-2-A and Example 4-2-B.

Transmittance spectra of the infrared-cut filters according to Example 4-2-A and Example 4-2-B are shown in FIG. 16A and FIG. 16B. The spectral transmittances of the infrared-cut filters according to Example 4-2-A and Example 4-2-B at a wavelength of 400 nm were 86.5% and 87.8%, respectively. It was suggested that increasing the time of heating at a high temperature results in increases in spectral transmittances in the visible region, including the spectral transmittance at a wavelength of 400 nm.

Example 4-3

A transparent glass substrate (manufactured by Schott AG under the product name "D263") made of borosilicate glass and having a size of 76 mm×76 mm×0.21 mm was prepared, and about 1.6 g of the composition for infrared-absorbing layers according to Example 1-6 was applied with a dispenser to a given area of the surface of the transparent glass substrate to form a film on the transparent glass substrate. The film was heat-treated at 85° C. for 3 hours, then at 125° C. for 3 hours, and then at 150° C. for 1 hour. The film was thus hardened to obtain an infrared-cut filter F. A 25 mm×25 mm portion of the infrared-cut filter F was cut out and obtained as an infrared-cut filter according to Example 4-3-A. Next, the infrared-cut filter F remaining after cutting was further heat-treated at 170° C. for 4 hours to obtain an infrared-cut filter G A 25 mm×25 mm portion of the infrared-cut filter G was cut out and obtained as an infrared-cut filter according to Example 4-3-B. Namely, the infrared-cut filter according to Example 4-3-A was produced through heat treatment at 85° C. for 3 hours, then at 125° C. for 3 hours, and then at 150° C. for 1 hour, and the infrared-cut filter according to Example 4-3-B was produced through heat treatment at 85° C. for 3 hours, then at 125° C. for 3 hours, then at 150° C. for 1 hour, and then at 170° C. for 4 hours.

<Evaluation>

Figure 17A:
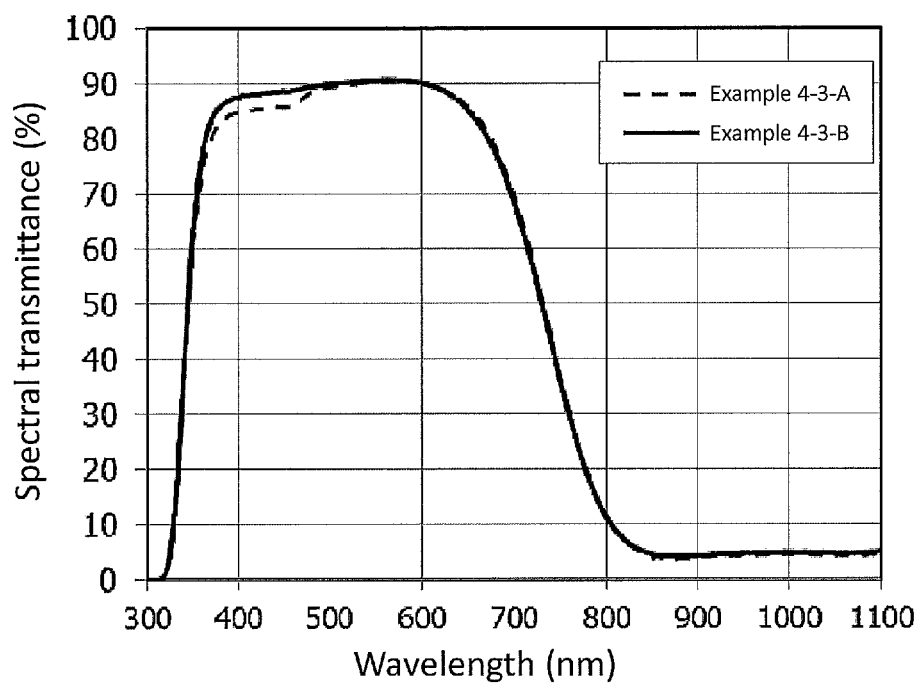
FIG. 17A shows transmittance spectra of infrared-cut filters according to Example 4-3-A and Example 4-3-B.
Figure 17B:
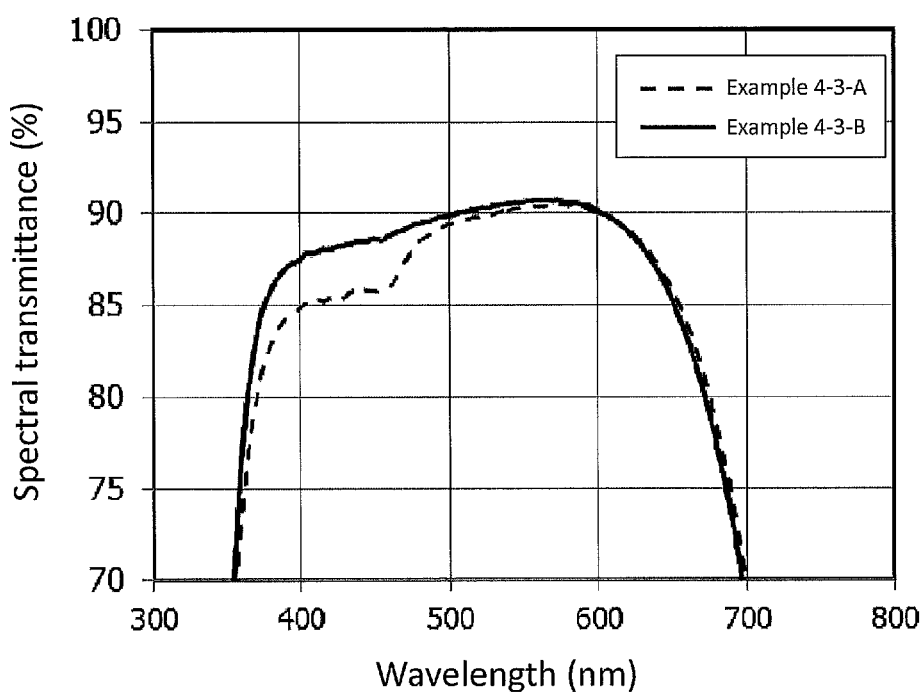
FIG. 17B shows enlarged visible portions of the transmittance spectra shown in FIG. 17A for the infrared-cut filters according to Example 4-3-A and Example 4-3-B.

Transmittance spectra of the infrared-cut filters according to Example 4-3-A and Example 4-3-B are shown in FIG. 17A and FIG. 17B. The spectral transmittances of the infrared-cut filters according to Example 4-3-A and Example 4-3-B at a wavelength of 400 nm were 84.9% and 87.5%, respectively. It was suggested that increasing the time of heating at a high temperature results in increases in spectral transmittances in the visible region, including the spectral transmittance at a wavelength of 400 nm.

Example 5

A composition for infrared-absorbing layers according to Example 5 was prepared as follows. An amount of 0.675 g (3.38 mmol) of copper acetate monohydrate and 36.0 g of tetrahydrofuran (THF) were mixed and stirred for 1 hour to obtain a copper acetate solution. Next, 0.669 g (2.02 mmol) of PLYSURF A208F (manufactured by DKS Co., Ltd.), which is a phosphoric acid ester compound, was added to the obtained copper acetate solution, which was stirred for 30 minutes to obtain a liquid A5. A liquid B was separately obtained by addition of 6.0 g of THF to 0.375 g (2.72 mmol) of butylphosphonic acid, followed by stirring for 30 minutes. Next, the liquid B was added to the liquid A5 while the liquid A5 was stirred, and the mixture was stirred at room temperature for 3 hours. Next, 12.0 g of toluene was added to the resulting solution, from which the solvents were evaporated in an 85° C. environment over 4.5 hours. To the thus obtained copper phosphonate dispersion was added 2.64 g of silicone resin (manufactured by Shin-Etsu Chemical Co., Ltd. under the product name "KR-300"), and the dispersion was stirred for 30 minutes. In this manner, the composition for infrared-absorbing layers according to Example 5 was obtained. In the composition for infrared-absorbing layers according to Example 5, Ca/Ce was 1.35 and Ch/Cc was 2.20.

To 4.58 g of ethanol was added 1.43 g of glycidoxypropyltrimethoxysilane, followed by 1.51 g of tetraethoxysilane, then 0.03 g of nitric acid solution diluted with ethanol (nitric acid concentration: 10 wt %), and then 2.17 g of water, and the resulting mixture was stirred for about 1 hour. In this manner, a coating liquid for an intermediate protective layer was obtained.

A transparent glass substrate (manufactured by Schott AG under the product name "D263") made of borosilicate glass and having a size of 76 mm×76 mm×0.21 mm was prepared, and 0.45 g of a coating liquid containing the composition for infrared-absorbing layers according to Example 5 was applied with a dispenser to a 30 mm×30 mm area of the surface of the transparent glass substrate to form a film. The film was heat-treated at 85° C. for 3 hours, then at 125° C. for 3 hours, then at 150° C. for 1 hour, and then at 170° C. for 4 hours. The film was thus hardened to form a first infrared-absorbing layer. Next, the coating liquid for an intermediate protective layer was applied to the surface of the first infrared-absorbing layer by spin coating (rotation speed: 300 rpm) to form a film. This film was heat-treated at 150° C. for 30 minutes and thus hardened. In this manner, an intermediate protective layer was formed.

Figure 18:
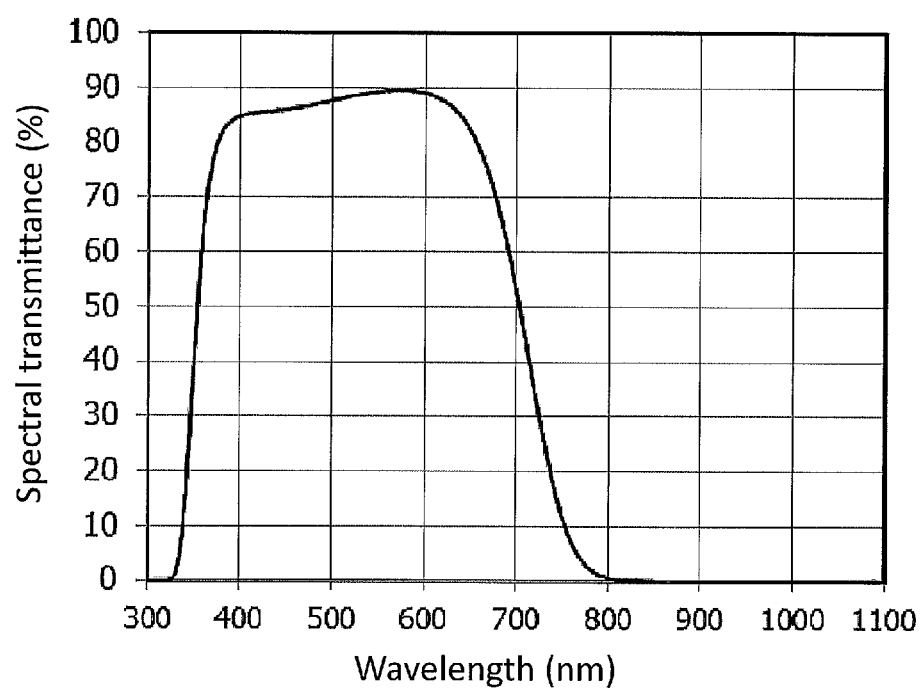
FIG. 18 shows a transmittance spectrum of an infrared-cut filter according to Example 5.

An amount of 0.45 g of a coating liquid containing the composition for infrared-absorbing layers according to Example 5 was applied with a dispenser to a 30 mm×30 mm area of the surface of the intermediate protective layer to form a film. The 30 mm×30 mm area corresponded to the area where the first infrared-absorbing layer was formed. The film was heat-treated at 85° C. for 3 hours, then at 125° C. for 3 hours, then at 150° C. for 1 hour, and then at 170° C. for 4 hours. The film was thus hardened to form a second infrared-absorbing layer. In this manner, an infrared-cut filter according to Example 5 which has a structure as shown in FIG. 4 was produced. The appearance of the infrared-cut filter according to Example 5 was observed, and neither crack nor delamination was found. The first infrared-absorbing layer and second infrared-absorbing layer in the infrared-cut filter according to Example 5 had good smoothness. The thickness of the infrared-cut filter according to Example 5 was 396 μm, and the thickness of the laminate composed of the first and second infrared-absorbing layers and the intermediate protective layer was 186 μm. A transmittance spectrum of the infrared-cut filter according to Example 5 is shown in FIG. 18. The infrared-cut filter according to Example 5 exhibited a high transmittance more than 80% in the visible region (at wavelengths of 400 nm to 600 nm) and also had such a high infrared-shielding performance that the transmittance at an infrared wavelength of 800 nm or more was 2% or less.

Example 6

The laminate composed of the first and second infrared-absorbing layers and the intermediate protective layer in the infrared-cut filter according to Example 5 was separated from the transparent glass substrate, and thus a sheet-shaped infrared-cut filter was obtained. Specifically, the infrared-cut filter according to Example 5 was cut by a slicer in a grid pattern from the coated side, and thus a chip substrate with a size of 9.0×8.4 mm was obtained. The chip substrate obtained was left in a −40° C. environment for 48 hours and then restored to room temperature. In the chip substrate thus obtained, the laminate composed of the first and second infrared-absorbing layers and the intermediate protective layer was almost separate from the transparent glass substrate. The laminate was completely separated from the transparent glass substrate with tweezers to obtain a sheet-shaped infrared-cut filter. A transmittance spectrum of the sheet-shaped infrared-cut filter thus obtained was measured. This transmittance spectrum was identical to the transmittance spectrum shown in FIG. 18 for the infrared-cut filter according to Example 5.

TABLE 1

| | | Example | | | | | | | | |
|---|---|---|---|---|---|---|---|---|---|---|
| | | 1-1 | 1-2 | 1-3 | 1-4 | 1-5 | 1-6 | 1-7 | 1-8 | 1-9 |
| Amount of copper acetate monohydrate [mmol] | | 1.13 | 1.13 | 1.13 | 1.13 | 1.13 | 1.13 | 1.13 | 1.13 | 1.13 |
| Amount of phosphoric acid ester [mmol] | PLYSURF A208F | 0.54 | 0.50 | 0.45 | 0.43 | 0.62 | 0.89 | — | — | 0.40 |
| | DDP-2 | — | — | — | — | — | — | 0.43 | — | — |
| | DDP-6 | — | — | — | — | — | — | — | 0.42 | — |
| Amount of phosphonic acid (butylphosphonic acid) [mmol] | | 0.98 | 0.98 | 0.98 | 0.98 | 0.92 | 0.83 | 0.98 | 0.98 | 0.98 |
| Molar ratio of phosphonic acid content Ca to phosphoric acid ester content Ce (Ca/Ce) | | 1.80 | 1.97 | 2.17 | 2.27 | 1.48 | 0.92 | 2.28 | 2.31 | 2.46 |

TABLE 1-continued

| | Example | | | | | | | | |
|---|---|---|---|---|---|---|---|---|---|
| | 1-1 | 1-2 | 1-3 | 1-4 | 1-5 | 1-6 | 1-7 | 1-8 | 1-9 |
| Molar ratio of reactive hydroxy group content Ch to copper ion content Cc (Ch/Cc) | 2.22 | 2.18 | 2.14 | 2.12 | 2.19 | 2.26 | 2.12 | 2.11 | 2.09 |
| Molar ratio of content of P to content of Cu | 1.35 | 1.31 | 1.27 | 1.25 | 1.37 | 1.53 | 1.25 | 1.24 | 1.22 |
| Average particle diameter of fine particles [nm] | 46 | | 42 | | | | | | |
| Spectral transmittance [%] 400 nm | 81.4 | 83.2 | 85.2 | 83.3 | 85.7 | 84.8 | 77.8 | 80.4 | 73.8 |
| 570 nm | 90.2 | 90.1 | 90.3 | 90.6 | 90.7 | 90.0 | 89.2 | 90.2 | 85.3 |

TABLE 2

| | Comparative Example | | | | | |
|---|---|---|---|---|---|---|
| | 1-1 | 1-2 | 1-3 | 1-4 | 1-5 | 1-6 |
| Amount of copper acetate monohydrate [mmol] | 1.13 | 1.13 | 1.13 | 1.13 | 1.13 | 1.13 |
| Amount of phosphoric acid ester (PLYSURF A208F) [mmol] | 0.35 | 0.30 | 0.22 | 0.35 | 0.50 | 0.35 |
| Amount of phosphonic acid (butylphosphonic acid) [mmol] | 0.98 | 0.98 | 1.05 | 0.96 | 1.25 | 1.25 |
| Molar ratio of phosphonic acid content Ca to phosphoric acid ester content Ce (Ca/Ce) | 2.82 | 3.28 | 4.72 | 2.74 | 2.51 | 3.57 |
| Molar ratio of reactive hydroxy group content Ch to copper ion content Cc (Ch/Cc) | 2.04 | 2.00 | 2.06 | 2.01 | 2.65 | 2.52 |
| Molar ratio of content of P to content of Cu | 1.18 | 1.13 | 1.13 | 1.16 | 1.55 | 1.42 |

TABLE 4

| | Example | | | Comparative Example |
|---|---|---|---|---|
| | 3-1 | 3-2 | 3-3 | 3-1 |
| Amount of copper acetate monohydrate [mmol] | 1.13 | 1.13 | 1.13 | 1.13 |
| Amount of phosphoric acid ester (PLYSURF A208F) [mmol] | 0.50 | 0.57 | 0.65 | 0.36 |
| Amount of phosphonic acid (ethylphosphonic acid) [mmol] | 0.95 | 0.95 | 0.95 | 0.95 |
| Molar ratio of phosphonic acid content Ca to phosphoric acid ester content Ce (Ca/Ce) | 1.92 | 1.67 | 1.47 | 2.64 |
| Molar ratio of reactive hydroxy group content Ch to copper ion content Cc (Ch/Cc) | 2.14 | 2.20 | 2.27 | 2.02 |
| Molar ratio of content of P to content of Cu | 1.29 | 1.36 | 1.42 | 1.17 |

TABLE 3

| | Example | | | | | | | | Comparative Example | |
|---|---|---|---|---|---|---|---|---|---|---|
| | 2-1 | 2-2 | 2-3 | 2-4 | 2-5 | 2-6 | 2-7 | 2-8 | 2-1 | 2-2 |
| Amount of copper acetate monohydrate [mmol] | 1.13 | 1.13 | 1.13 | 1.13 | 1.13 | 1.13 | 1.13 | 1.13 | 1.13 | 1.13 |
| Amount of phosphoric acid ester (PLYSURF A208F) [mmol] | 0.89 | 0.67 | 0.45 | 0.67 | 0.67 | 0.67 | 0.67 | 0.67 | 0.67 | 0.30 |
| Amount of phosphonic acid (butylphosphonic acid) [mmol] | 0.76 | 0.83 | 0.89 | 0.93 | 0.88 | 0.77 | 0.72 | 0.55 | 1.81 | 0.88 |
| Amount of phosphoric acid [mmol] | 0..05 | 0..05 | 0..05 | 0..05 | 0..05 | 0..05 | 0.12 | 0.23 | 0.05 | 0.05 |
| Molar ratio of phosphonic acid content Ca to phosphoric acid ester content Ce (Ca/Ce) | 0.85 | 1.23 | 1.99 | 1.39 | 1.32 | 1.14 | 1.07 | 0.82 | 2.70 | 2.94 |
| Molar ratio of reactive hydroxy group content Ch to copper ion content Cc (Ch/Cc) | 2.23 | 2.15 | 2.07 | 2.35 | 2.26 | 2.05 | 2.09 | 1.99 | 3.90 | 1.93 |
| Molar ratio of content of P to content of Cu | 1.51 | 1.37 | 1.23 | 1.47 | 1.43 | 1.32 | 1.34 | 1.29 | 2.25 | 1.1 |
| Average particle diameter of fine particles [nm] | 33 | | | | | | 46 | | | |
| Spectral transmittance [%] 400 nm | 89.2 | 88.0 | 81.6 | 86.2 | 87.6 | 82.8 | 84.6 | 77.1 | — | — |
| 570 nm | 91.1 | 90.7 | 89.0 | 89.3 | 90.7 | 89.7 | 89.8 | 86.9 | — | — |

TABLE 4-continued

|  |  | Example | | | Comparative Example |
|---|---|---|---|---|---|
|  |  | 3-1 | 3-2 | 3-3 | 3-1 |
| Average particle diameter of fine particles [nm] | | 75 | | | |
| Spectral transmittance [%] | 400 nm | 76.1 | 81.0 | 77.7 | — |
|  | 570 nm | 89.0 | 89.6 | 88.6 | — |

The invention claimed is:

1. A composition comprising:
a compound including a copper ion and a phosphonic acid represented by following formula (a);
a phosphoric acid ester including at least one selected from the group consisting of a phosphoric acid diester represented by following formula (b1) and a phosphoric acid monoester represented by following formula (b2);
a phosphoric acid; and
a curable resin,

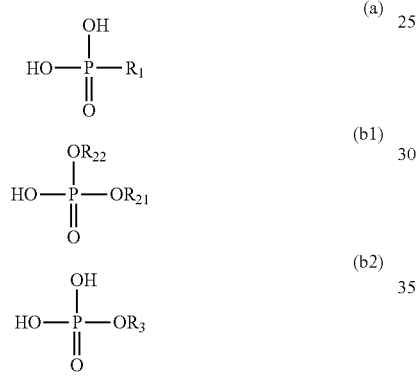

where $R_1$ is an alkyl group with 2 to 4 carbon atoms, $R_{21}$, $R_{22}$ and $R_3$ are each a monovalent functional group represented by $-(CH_2CH_2)_nR_4$, n is an integer of 1 to 25, $R_4$ is an alkyl group with 6 to 25 carbon atoms, and $R_{21}$, $R_{22}$ and $R_3$ are same or different group,
wherein a ratio of a content of the phosphoric acid to a content of the copper ion is 0.04 to 0.21 on a molar basis,
wherein a ratio Ca/Cc of a content of the phosphonic acid to a total content of the phosphoric acid ester is 2.5 or less on a molar basis, and
wherein a ratio of a total content of a phosphorus atom to a content of the copper ion is 1.29 to 1.51 on a molar basis.

2. The composition according to claim 1, wherein each of the phosphonic acid, the phosphoric acid ester, and the phosphoric acid has a reactive hydroxy group, a third ratio Ch/Cc of a total content of the reactive hydroxy group to a content of the copper ion is 1.95 to 2.35 on a molar basis.

3. The composition according to claim 2, wherein the phosphonic acid has two reactive hydroxy groups a molecular, and each of the phosphoric acid diester and phosphoric acid monoester has one reactive hydroxy group a molecular.

4. The composition according to claim 1, the curable resin including a silicone resin.

5. The composition according to claim 1, wherein an amount of the phosphonic acid is 10 to 50 parts per 100 parts of the curable resin on a mass basis.

6. The composition according to claim 1, wherein the composition capable of curing to form an infrared-cut filter, a transmittance spectrum, for a light incident on the infrared-cut filter at an incident angle of 0°, has a transmittance of 75% or more at a wavelength of 400 nm.

7. The composition according to claim 6, wherein the transmittance spectrum further includes follows:
(i) a transmittance of 70% or more in a wavelength range of 400 nm to 600 nm;
(ii) a transmittance of 5% or less in a wavelength range of 800 nm to 1000 nm.

8. A method for producing the composition according to claim 1, comprising:
mixing a cupper salt and the phosphoric acid ester in a first solvent to obtain a solution (A);
adding and mixing the phosphonic acid and the phosphoric acid into the solution (A) to obtain a solution (B);
adding and mixing the curable resin and a second solvent into the solution (B) to obtain a solution (C), the second solvent having a boiling point higher than that of the first solvent; and
heating the solution (C) to evaporate a portion of the first solvent.

9. An infrared-cut filter, comprising:
an infrared-absorbing layer formed by the cured product of the composition according to claim 1.

10. The infrared-cut filter according to claim 9, wherein the transmittance spectrum, for a light incident on the infrared-cut filter at an incident angle of 0°, includes a transmittance of 75% or more at a wavelength of 400 nm,
wherein the infrared-absorbing layer has a thickness of 40 μm to 200 μm.

11. The infrared-cut filter according to claim 10, wherein the transmittance spectrum further includes follows:
(i) a transmittance of 70% or more in a wavelength range of 400 nm to 600 nm;
(ii) a transmittance of 5% or less in a wavelength range of 800 nm to 1000 nm.

* * * * *